(12) United States Patent
Takano et al.

(10) Patent No.: US 6,332,496 B1
(45) Date of Patent: Dec. 25, 2001

(54) REFRIGERATION CYCLE APPARATUS

(75) Inventors: Yoshiaki Takano, Kosai; Satoshi Izawa, Kariya, both of (JP)

(73) Assignee: Denso Corporation, Aichi-Pref. (JP)

( * ) Notice: Subject to any disclaimer, the term of this patent is extended or adjusted under 35 U.S.C. 154(b) by 0 days.

(21) Appl. No.: 09/666,154

(22) Filed: Sep. 19, 2000

Related U.S. Application Data

(62) Division of application No. 09/126,802, filed on Jul. 31, 1998, now Pat. No. 6,148,632.

(30) Foreign Application Priority Data

| Jul. 31, 1997 | (JP) | 9-206292 |
| Sep. 24, 1997 | (JP) | 9-258807 |
| Dec. 24, 1997 | (JP) | 9-355861 |
| Feb. 2, 1998 | (JP) | 10-021338 |
| Apr. 10, 1998 | (JP) | 10-098889 |

(51) Int. Cl.$^7$ ................. F25B 1/00; B60H 1/00
(52) U.S. Cl. .......... 165/202; 62/228.3; 62/DIG. 17
(58) Field of Search .............. 62/228.3, 228.5, 62/229, DIG. 17; 236/1 EA; 165/202

(56) References Cited

U.S. PATENT DOCUMENTS

| 3,435,626 | 4/1969 | Wile . | |
| 4,785,640 | 11/1988 | Naruse | 62/196.4 |
| 4,856,293 | 8/1989 | Takahashi | 62/228.3 |
| 4,880,356 | 11/1989 | Sizuki et al. | 417/53 |
| 4,889,474 | 12/1989 | Nakajima . | |
| 4,905,477 | 3/1990 | Takai | 62/196.3 |
| 4,989,414 | 2/1991 | Murayama et al. | 62/228.4 |
| 5,070,707 | 12/1991 | Ni | 62/234 |
| 5,257,507 | 11/1993 | Taguchi | 62/133 |
| 5,291,941 | 3/1994 | Enomoto et al. . | |
| 5,404,729 | 4/1995 | Matsuoka et al. | 62/179 |
| 5,499,511 | 3/1996 | Hara et al. | 62/180 |
| 5,653,119 | 8/1997 | Kimura et al. | 62/228.5 |
| 5,823,000 | 10/1998 | Takai | 62/133 |
| 6,170,277 | * 1/2001 | Porter et al. | 62/DIG. 17 |

FOREIGN PATENT DOCUMENTS

| 0297514 | 6/1988 | (EP) . | |
| 0256764 | * 10/1989 | (JP) | 62/228.3 |
| 5-223357 | 8/1993 | (JP) . | |

\* cited by examiner

Primary Examiner—William Wayner
(74) Attorney, Agent, or Firm—Pillsbury Winthrop LLP

(57) ABSTRACT

A refrigeration cycle is switched from a refrigeration cycle circuit to a hot gas heater circuit to make the hot gas discharged from a compressor flow into an evaporator and heat the vehicle passenger compartment, at which time, when a suction pressure (Ps) of the compressor becomes a low pressure below a first predetermined pressure, the discharge volume (Vc) of the compressor is made larger to ensure a sufficient auxiliary heating performance. Further, when the hot gas is made to flow into the evaporator to heat the vehicle passenger compartment, if the suction pressure (Ps) of the compressor becomes a higher pressure over a second predetermined pressure, the discharge volume (Vc) of the compressor is made smaller to protect the refrigeration cycle parts and lighten the ON, OFF shock.

4 Claims, 28 Drawing Sheets

Fig.19
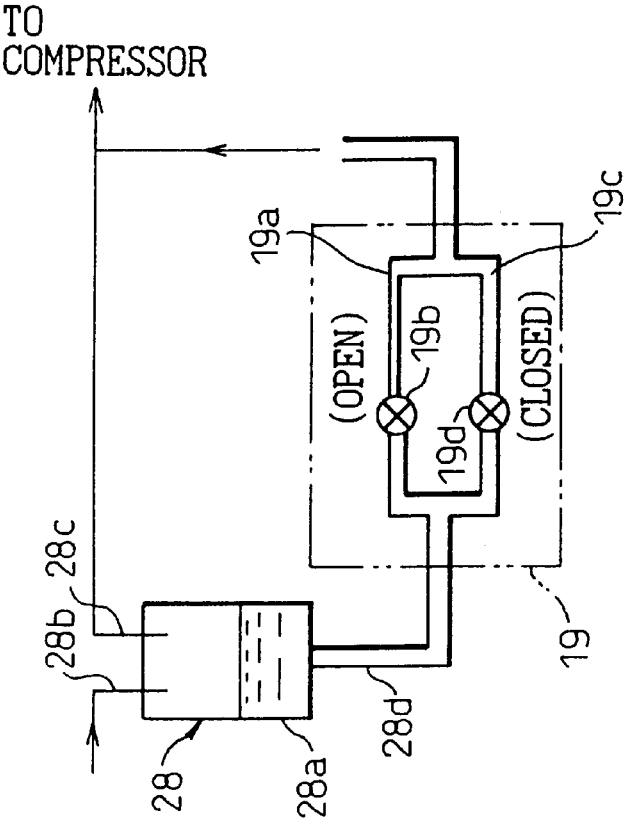
(a)
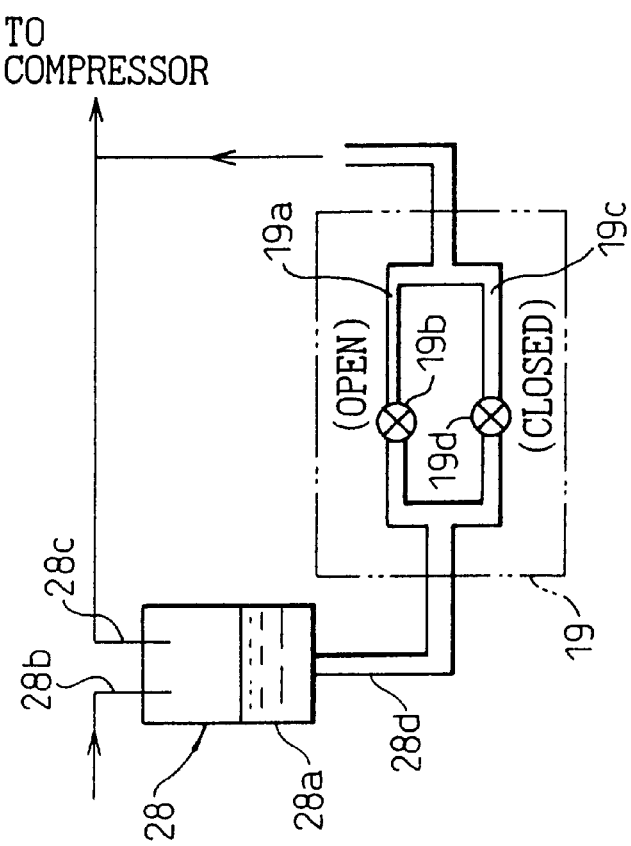
(b)

REFRIGERATION CYCLE APPARATUS

This is a division of application No. 09/126,802, filed Jul. 31, 1998 U.S. Pat. No. 6,148,632.

BACKGROUND OF THE INVENTION

1. Field of the Invention

The present invention relates to a refrigeration cycle apparatus for heating the interior of a vehicular passenger compartment, more particularly it relates to a vehicular use air-conditioning system provided with a refrigeration cycle apparatus designed to guide the high temperature, high pressure gas phase refrigerant discharged from a refrigerant compressor into a refrigerant evaporator and heat the air flowing through a duct at that refrigerant evaporator.

2. Description of the Related Art

In the past, the general vehicular use heating system used has been a hot water type heating system which guides the coolant water which had been used for cooling the engine into a heater core in a duct to heat the air flowing through the duct by that heater core and thereby heat the interior of the passenger compartment. This hot water type heating system, however, suffered from the problem of a remarkably insufficient heating capacity when just starting up the engine and activating the hot water heating system, that is, when the hot water heating system is just starting up, when the temperature of the outside air was low and the temperature of the used cooling water was consequently low.

To solve the above problem, for example, Japanese Unexamined Patent Publication (Kokai) No. 5-223357 has proposed a vehicular use air conditioning system (related art) provided with a refrigeration cycle apparatus (auxiliary heating system) designed to augment the heating capacity of the heater core by leading the high temperature, high pressure gas phase refrigerant (hot gas) discharged from the compressor of the refrigeration cycle apparatus through a pressure reducing apparatus to a refrigerant evaporator and heat the air flowing through the duct at that refrigerant evaporator. Note that the compressor was an engine-driven compressor driven by the engine through an electromagnetic clutch.

During the heating operation, when the temperature of the cooling water is over a predetermined temperature, the heating capacity of the heater core of the hot water type heating system is sufficiently high, so the compressor is turned off and the auxiliary heating system is deactivated. Further, when the temperature of the cooling water is lower than a predetermined temperature, the heating capacity of the heater core of the hot water type heating system is insufficient, so the compressor is turned on to activate the auxiliary heating system.

Further, when the discharge pressure from the compressor is higher than a predetermined pressure, the load on the compressor is too high, so the compressor is turned off to deactivate the auxiliary heating system and protect the refrigeration cycle apparatus. Further, when the discharge pressure from the compressor is less than a predetermined pressure, the compressor is turned on to activate the auxiliary heating system.

Further, in the apparatus of this related art, an accumulator is provided between the refrigerant evaporator outlet and the compressor suction side to separate the gas and liquid phases of the refrigerant and lead the gas phase refrigerant for use elsewhere so as to prevent the suction of liquid phase refrigerant to the compressor and therefore avoid an adverse effect on the life of the compressor by liquid compression.

In this refrigeration cycle apparatus of the related art, however, if the heating operation at the hot gas heater circuit is continued for a predetermined time (for example, about 30 minutes), both the high-side pressure and the low-side pressure of the refrigeration cycle apparatus become higher than during the cooling operation using the ordinary refrigeration cycle circuit. For example, the high-side pressure of the refrigeration cycle apparatus would become 20 to 25 $kg/cm^2$ during a heating operation (operation by a hot gas heater circuit) and 13 to 15 $kg/cm^2$ at a cooling operation (operation by a refrigeration cycle circuit.) Further, the low-side pressure of the refrigeration cycle apparatus would become 4 to 5 $kg/cm^2$ during a heating operation and 1 to 2 $kg/cm^2$ during a cooling operation.

Further, during a heating operation by the hot gas heater circuit, compared with the cooling operation at the normal refrigeration cycle circuit, as mentioned above, both the high-side pressure and the low-side pressure of the refrigeration cycle apparatus would become higher and the torque fluctuation would become greater when turning the compressor from the on state to the off state. Therefore, when the compressor was turned from the on state to the off state during operation of the vehicle, the rotational speed of the engine belt driving the compressor would fluctuate tremendously and therefore the problem would arise of deterioration in both the power performance and driveability of the vehicle.

It may therefore be considered to control the capacity and control the pressure without frequently turning the compressor on and off by changing the compressor to a cooler use variable volume type compressor such as used in the past. This conventional cooler use variable volume type compressor, however, is designed to reduce the discharge volume from the compressor the lower the suction pressure to the compressor.

When installing such a cooler use variable volume type compressor in a hot gas heater circuit for a heating operation, the larger the heating load, that is, the lower the temperature of the air sucked into the evaporator, the lower the temperature and the pressure of the refrigerant used for heat exchange with the air in the evaporator. Due to this, since the discharge volume from the compressor becomes smaller due to the variable volume control of the compressor, the flow of high temperature refrigerant into the evaporator also becomes smaller and therefore the problem arises that the auxiliary heating performance, that is, the performance in assisting the heating capacity of the heater core, is no longer sufficiently manifested.

Further, when installing a cooler use variable volume type compressor into the hot gas heater circuit for a heating operation, when the heating capacity is small, that is, when the temperature of the air sucked into the evaporator is high, the temperature and the pressure of the refrigerant used for the heat exchange with the air in the evaporator become high. Due to this, since the discharge volume from the compressor becomes larger due to the variable volume control of the compressor, the discharge pressure from the compressor becomes larger.

If the high-side pressure of the refrigeration cycle apparatus were to rise to an abnormally high pressure temperature (for example, 27 kg/cm2), the components of the cycle such as the refrigerant piping would malfunction or break. Further, even if the heating load is small, as explained above, if the high-side pressure of the refrigeration cycle apparatus reaches 25 $kg/cm^2$, the flow of the high pressure refrigerant into the evaporator will also become large, so the problem will arise of an excessive auxiliary heating capacity for assisting the heating capacity of the heater core.

Further, in the above apparatus of the related art, while no reference was made to the specific configuration of the apparatus, as is generally known, a calibrated orifice passage for recovering the fine oil is provided near the bottom of the inside of the accumulator. The liquid refrigerant (including the lubrication oil) near the bottom of the inside of the accumulator is designed to be drawn in from this calibrated orifice passage so as to eliminate the insufficient lubrication of the compressor and protect the compressor life.

The present inventors engaged in actual experiments and studies on how far the opening of the calibrated orifice passage (the passage diameter, also called the bleed port diameter) should be set and found that the following problem arises. That is, when the opening degree of the calibrated orifice passage is enlarged to the maximum value (for example, $\phi 2.5$) at the time of heating operation in the winter (operation by hot gas heater circuit), the amount of suction of liquid refrigerant into the compressor through the calibrated orifice passage increases, so the amount of compression work of the compressor increases and it is possible to increase the heating capacity as well. On the other hand, since the amount of suction of the liquid refrigerant at the time of a cooling operation in the summer also increases, the amount of oil circulating in the cycle also increases which invites a reduction in the cooling capacity and an increase in the power consumption of the compressor.

Therefore, if the diameter of the calibrated orifice passage is reduced to the optimal value for a cooling operation in the summer (for example, $\phi 1.2$), the amount of suction of liquid refrigerant during a cooling operation in the summer will fall and the cooling capacity will be improved so it would be possible to reduce the power consumption of the compressor, but at the time of a heating operation in the winter, the amount of compression work of the compressor will fall so the heating capacity will fall and become insufficient.

SUMMARY OF THE INVENTION

An object of the present invention is to provide a refrigeration cycle apparatus provided with a variable discharge volume means enabling achievement of a sufficient heating performance. Further, an object is to provide a refrigeration cycle apparatus able to prevent breakdown and breakage of the refrigerant piping and other cycle components and able to prevent an excessive heating capacity. Further, an object is to provide a vehicular use air-conditioning system able to obtain an optimal venting temperature by the minimum necessary power.

A further object of the present invention is to secure the capacity and reduce the power consumption of the compressor during a cooling operation and, simultaneously, secure the capacity at the time of a heating operation.

According to a first aspect of the present invention, there is provided a refrigeration cycle apparatus comprising:
(a) a refrigerant compressor driven in rotation by an internal combustion engine so as to compress the refrigerant,
(b) a refrigerant evaporator for performing heat exchange with air on the inflowing refrigerant to cause it to evaporate and vaporize,
(c) a refrigerant circulation circuit for circulating the refrigerant discharged by the refrigerant compressor to the refrigerant evaporator and returning it to the refrigerant compressor, and
(d) variable discharge volume means for increasing the discharge from the refrigeration cycle apparatus when a suction pressure into the refrigeration cycle apparatus becomes lower than a predetermined value.

According to a second aspect of the present invention, there is provided a vehicular air-conditioning system comprising:
(a) an air-conditioning duct for leading air-conditioned air into a vehicle passenger compartment,
(b) a refrigerant evaporator arranged in the air-conditioning duct for performing heat exchange with air on the inflowing refrigerant to cause it to evaporate and vaporize,
(c) a heater core arranged in the air-conditioning duct at a downstream side of air of the refrigerant evaporator for heating air using used cooling water of an internal combustion engine as a source of heat for heating,
(d) a refrigerant compressor driven in rotation by an internal combustion engine so as to compress the refrigerant,
(e) a refrigerant circulation circuit for circulating the refrigerant discharged by the refrigerant compressor to the refrigerant evaporator and returning it to the refrigerant compressor,
(f) a cooling water circulation circuit for circulating the cooling water flowing out from the internal combustion engine to the heater core and returning it to the internal combustion engine,
(g) a variable discharge volume means for reducing the discharge volume from the refrigeration cycle apparatus when the discharge pressure from the refrigeration cycle apparatus becomes higher than a setting,
(h) a venting temperature detecting means for detecting a temperature of air vented from the air-conditioning duct into the vehicle passenger compartment, and
(i) a variable discharge pressure means for setting the discharge pressure lower the closer the venting temperature detected by the venting temperature detecting means is to a target value.

BRIEF DESCRIPTION OF THE DRAWINGS

The present invention may be more fully understood from the description of the preferred embodiments of the invention set forth below together with the accompanying drawings, in which:

FIG. 13A is a graph of the relationship between the suction pressure and discharge volume of a compressor, while

FIG. 17A is a graph of the relationship between the setting of the discharge pressure of a compressor and the control current, while

FIG. 19 is an explanatory view of the valve mechanism in the seventh embodiment of the present invention;

DESCRIPTION OF THE PREFERRED EMBODIMENTS

Figure 1:
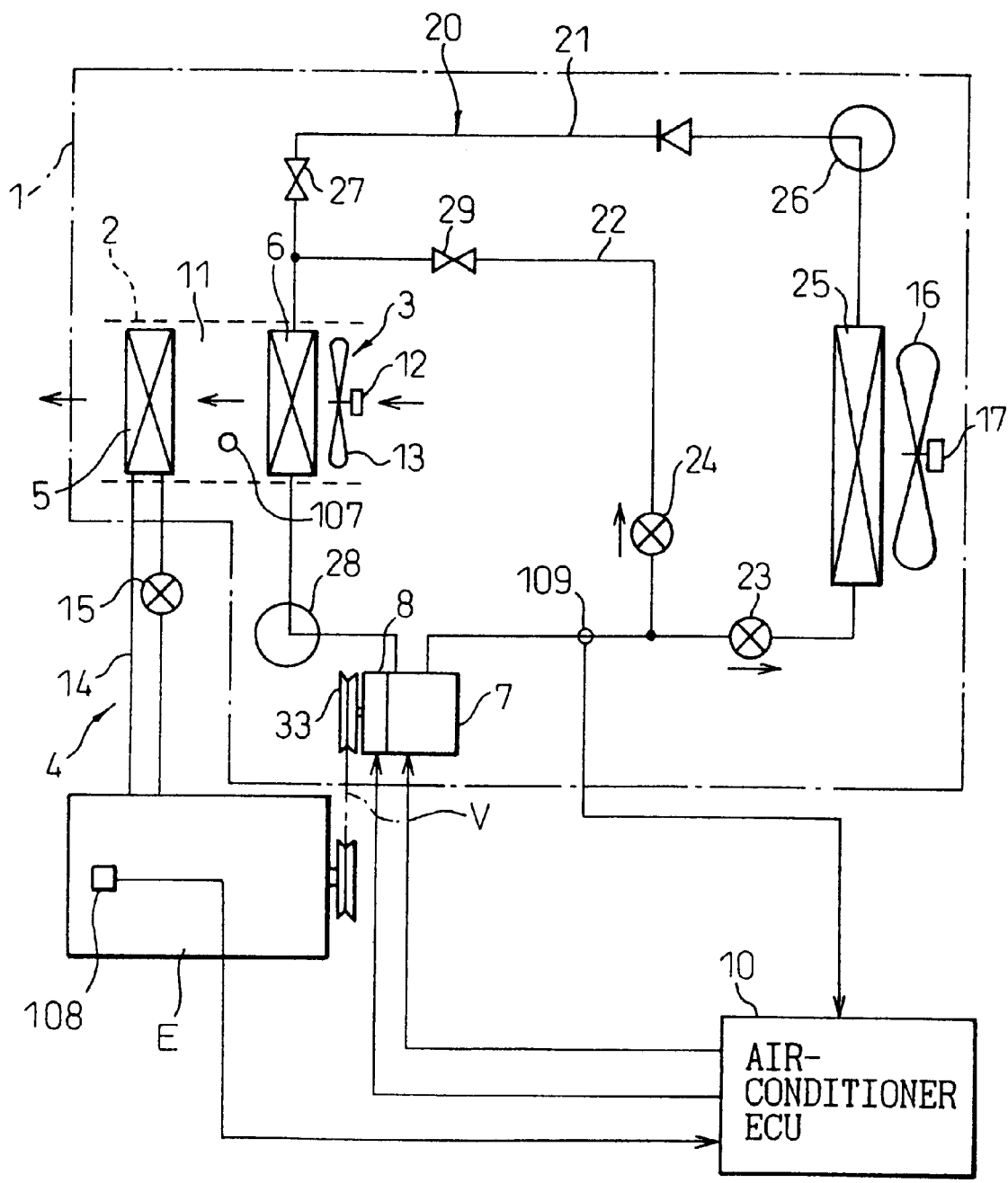
FIG. 1 is a view of the overall configuration of a vehicular use air-conditioning system according to a first embodiment of the present invention.

FIG. 1 to FIG. 7 show a first embodiment of the present invention. FIG. 1 shows the overall structure of a vehicular use air-conditioning system.

The vehicular use air-conditioning system of this embodiment is a vehicular use air-conditioning system where the air conditioning means (actuators) in the air conditioning units 1 for air-conditioning the interior passenger compartment of a vehicle carrying an engine (internal combustion engine) as a main heat source for heating are controlled by an air-conditioning control apparatus (hereinafter referred to as an air-conditioning ECU) 10.

The air-conditioning unit 1 is provided with an air-conditioning duct 2 constituting an air-conditioning passage 11 for leading air-conditioned air into the passenger compartment. At the most upstream side of the air-conditioning duct 2 are provide an outside air suction port, an inside air suction port, and an inside and outside air switching door (none shown). At the further downstream side of the air is provided a centrifugal blower fan 3. Further, at the most downstream side of the air in the air-conditioning duct 2 are provided a defroster vent, a face vent, or a foot vent or other vent and mode door (not shown).

The centrifugal blower fan 3 is comprised of a scroll casing provided integrally with the air-conditioning duct 2, a blower fan motor 12 controlled by a not shown blower fan driving circuit, and a centrifugal blower fan 13 driven to rotate by the blower fan motor 12. Note that the flow rate of the centrifugal blower fan 13 of this embodiment is designed to be switched continuously or in stages from a 0 stage (OFF) to 32 stage.

Next, at the upstream side of the air from the vent, there is provided a heater core 5 of a hot water type heating system (main heating system) for reheating the air passing through a later mentioned evaporator 6. The heater core 5 is provided in the middle of the cooling water circulation circuit 14 where a circulatory flow of cooling water is produced by a water pump (not shown) driven by the engine E. The heater core 5 is a downstream side heat exchanger (second heating use heat exchanger) through which the cooling water which has absorbed the exhaust heat of the engine E is recirculated when a hot water valve 15 provided in the cooling water circulation circuit 14 and which uses the cooling water as a heat source for heating so as to reheat the air, that is, performs an air heating action. The engine E, heater core 5, cooling water circulation circuit 14, and hot water valve 15 comprise a hot water type heating system 4.

Next, between the centrifugal blower fan 3 and the heater core 5 is arranged an evaporator 6 forming a component of the refrigeration cycle apparatus 20 mounted in the engine so as to block the entire area of the air passage 11 in the air-conditioning duct 2. The above refrigeration cycle apparatus 20 is provided with a first refrigerant circulation circuit (hereinafter referred to as a refrigeration cycle circuit) 21, a second refrigerant circulation circuit (hereinafter referred to as a hot gas heater circuit) 22, and first and second solenoid valves 23 and 24 for switching between the refrigeration cycle circuit 21 and the hot gas heater circuit 22.

The refrigeration cycle circuit 21 is a refrigeration cycle apparatus in which the high temperature, high pressure gas phase refrigerant discharged from the compressor 7 is recirculated from the first solenoid valve 23 to the condenser (refrigerant condenser) 25, receiver (gas-liquid separator) 26, expansion valve (first pressure reducing means) 27, evaporator 6, accumulator (gas-liquid separator) 28, and compressor 7 in that order. Further, the hot gas heater circuit 22 is a refrigerant circuit in which the high temperature, high pressure gas phase refrigerant (hot gas) discharged from the compressor 7 is recirculated from the second solenoid valve 24 to the pressure reducing apparatus (second pressure reducing means) 29, evaporator 6, accumulator 28, and compressor 7 in that order.

The refrigeration cycle apparatus 20 recirculates the refrigerant into the refrigeration cycle circuit 21 when the first solenoid valve 23 opens and the second solenoid valve 24 closes. Further, the refrigeration cycle apparatus 20 recirculates the refrigerant to the hot gas heater circuit 22 when the first solenoid valve 23 closes and the second solenoid valve opens. Note that the circulation circuit switching means of the present invention is comprised by the first and second solenoid valves 23 and 24. Further, reference numeral 16 is a cooling blower fan which is driven by a drive motor 17 to forcibly blow outside air to the condenser 25.

The evaporator 6 corresponds to the refrigerant evaporator of the present invention and functions as a cooling use heat exchanger which evaporates the low temperature gas and liquid phase refrigerant flowing in from the expansion valve 27 to cool the passing air when the refrigerant flows in the refrigeration cycle circuit 21. Further, the evaporator 6 functions as a first heating use heat exchanger (hot gas heater of auxiliary heating system and auxiliary heat source system) which passes the high temperature gas phase refrigerant flowing in from the pressure reducing apparatus 29 to heat the air passing through it when the refrigerant flows through the hot gas heater circuit 22. Here, the expansion valve 27 not only insulates and expands the refrigerant, but also adjusts the amount of the refrigerant circulated in accordance with the superheating of the refrigerant at the outlet of the evaporator 6.

Figure 2:
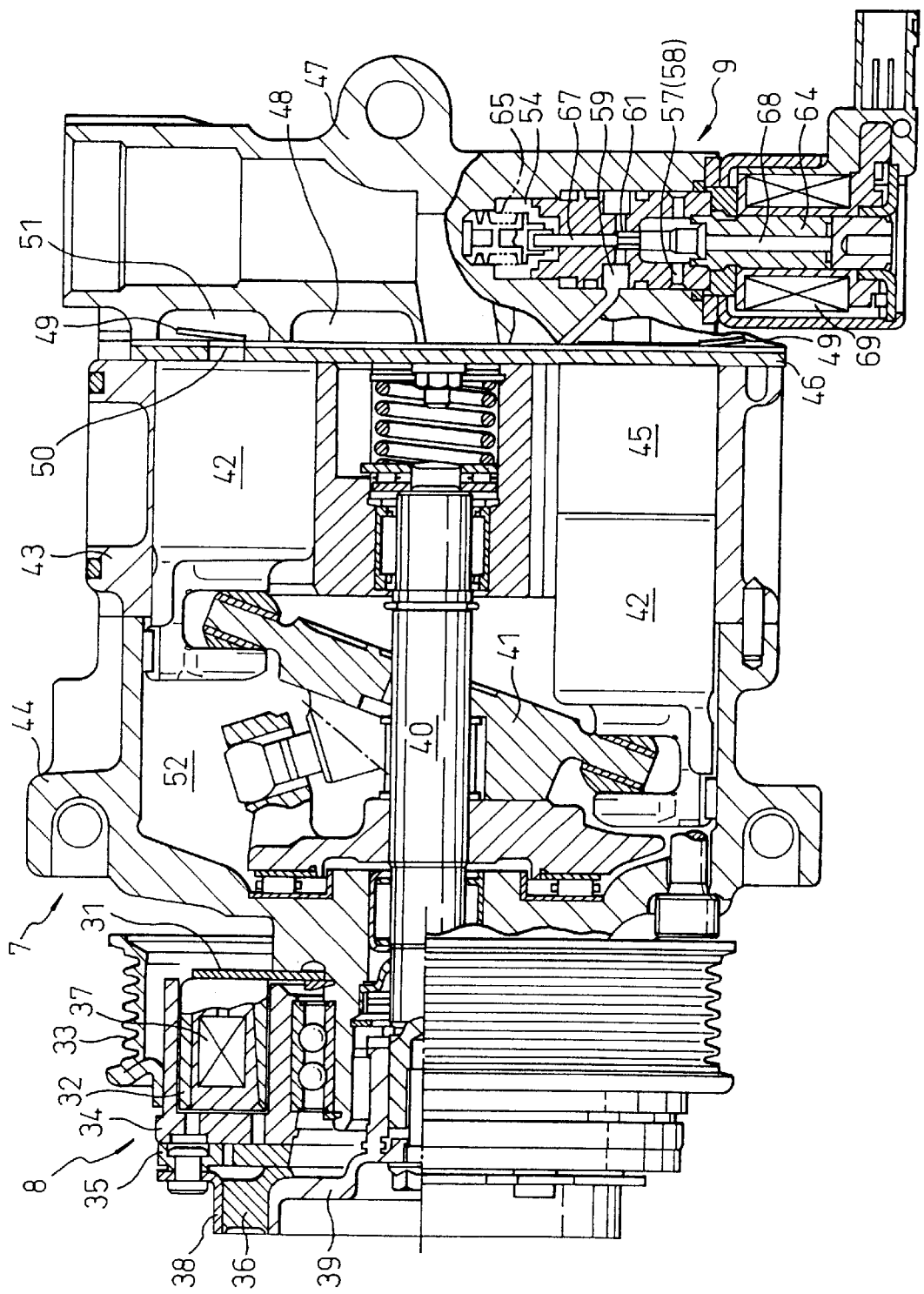
FIG. 2 is a sectional view of an electromagnetic clutch and a variable discharge volume type compressor according to the first embodiment of the present invention.

Next, the compressor 7 of the present embodiment will be briefly explained based on FIG. 1 to FIG. 5. Here, FIG. 2 is a view of a variable discharge volume type compressor formed integrally with an electromagnetic clutch. The compressor 7 has connected to it an electromagnetic clutch 8 which transmits or shuts off the power of the engine E to the compressor 7.

The electromagnetic clutch 8 is comprised of a stator housing 32 affixed to a housing 44 of the compressor 7 through an annular mounting flange 31, a rotor 34 to the outer periphery of which is connected a pulley 33 connected to the engine E by a belt V, an armature 35 arranged facing the rotor 3 across a close distance and formed with a friction surface for frictionally engaging with the friction surface of the rotor 34, an electromagnetic coil 37 for attracting the armature 35 to the rotor 34 against the elastic force of the rubber hub (elastic body) 36 by the generation of a magnetic flux when energized, and an inner hub 39 connecting the armature 35 and the shaft 40 of the compressor 7 through an outer hub 38 and rubber hub 36.

The compressor 7 corresponds to the refrigerant compressor of the present invention. It is a known for example waffle type which can change the discharge volume and is comprised of a shaft 40 rotating integrally with the inner hub 39 of the electromagnetic clutch 8, a swash plate 41 affixed to the shaft 40 at an angle, a piston 42 set on the swash plate 41, a housing (front housing) 44 connected to a cylinder (rear housing) 43 through which the piston 42 slides, and an electromagnetic volume control valve (corresponding to the variable discharge volume means of the present invention) 9 connected to the rear end of the housing 44 and able to change the discharge volume of the compressor 7.

Here, the cylinder 43 forms a cylinder chamber 45 with the piston 42. Toward the center of the baffle plate 46 forming the cylinder chamber 45 is formed a suction port (not shown) opened and closed by a suction valve (not shown) formed by an elastic metal sheet. The suction port is communicated with a suction port 48 formed in the valve body 47 of the electromagnetic volume control valve 9. Further, toward the outside of the valve plate 46 is formed a discharge port 50 opened and closed by a discharge valve 49 formed by an elastic metal sheet. The discharge port 50 is communicated with a discharge port 51 formed in the valve body 47. Note that inside the housing 44 is provided a crank chamber 52 for moving the swash plate 41 to freely displace and fixed calibrated orifices 53a and 53b(see FIG. 3) for effectively communicating the suction port 48 with the discharge port 51.

From the above, it is seen that when the electromagnetic coil 37 of the electromagnetic clutch 8 is in the energized state (ON), the armature 35 of the electromagnetic clutch 8 is drawn to the rotor 34 and the rotor 34 and armature 35 frictionally engage, whereby the drive power of the engine E is transmitted through the belt V and the electromagnetic clutch 8 to the shaft 40 of the compressor 7. By this, the refrigeration cycle apparatus 20 is activated and thereby the air cooling action or air heating action of the evaporator 6 is performed. Further, when the electromagnetic coil 37 of the electromagnetic clutch 8 is deenergized (OFF), the armature 35 of the electromagnetic clutch 8 moves away from the rotor 34 and the frictional engagement of the rotor 34 and armature 35 is broken. Due to this, the drive power of the engine E is not transmitted to the shaft 40 of the compressor 7 and the air cooling action or air heating action by the evaporator 6 is stopped.

Figure 3:
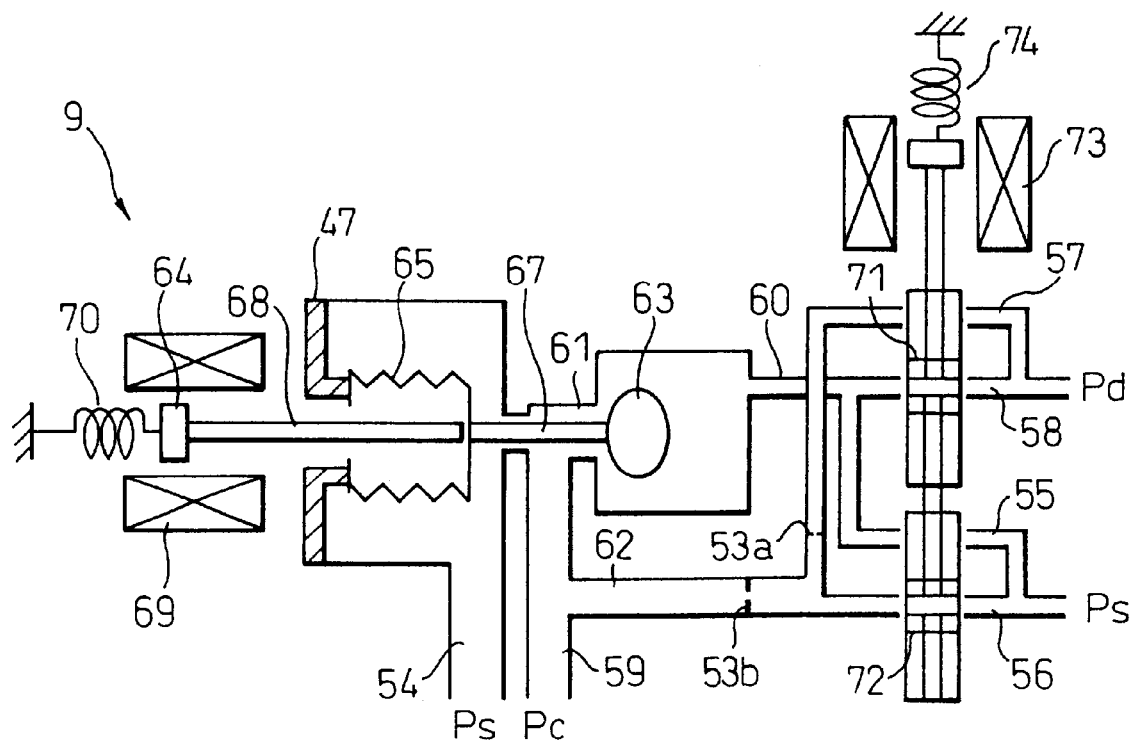
FIG. 3 is an explanatory view showing the general structure of an electromagnetic volume control valve according to the first embodiment of the present invention.

Next, an explanation will be made of the electromagnetic volume control valve 9 based on FIG. 1 to FIG. 3. Here, FIG. 3 is a view of the general structure of an electromagnetic volume control valve 9 housed in the compressor 7.

A refrigerant pressure circuit is formed in the body of the compressor 7 and the valve body 47 of the electromagnetic volume control valve 9. The refrigerant pressure circuit is comprised of pressure passages 54 to 56 through which the suction pressure (Ps) of the compressor 7 is guided, pressure passages 57 and 58 through which the discharge pressure (Pd) of the compressor 7 is guided, a pressure passage 59 giving crank chamber pressure (Pc) to the crank chamber 52 of the compressor 7, a passage port 61 communicating with the communication passage 60, and a communication passage 62 communicating with the pressure passage 59. Note that the communication passage 60 communicates the convergence point of the downstream side of the pressure passage 55 and the downstream side of the pressure passage 58 with the communication port 61. Further, the communication passage 62 communicates the convergence point of the downstream side of the pressure passage 56 and the downstream side of the pressure passage 57 with the pressure passage 59.

The opening degree of the communication port 61 is determined by the stopping position of the valve element 63. The stopping position of the valve element 63 is designed so as to be determined by the displacement position of the plunger 64 and the bellows 65. The plunger 64 and bellows 65 are communicated with the valve element 63 through the rods 67 and 68. The setting position of the plunger 64 is designed so as to be changed by the magnitude of the control current to the electromagnetic coil 69. Note that reference numeral 70 indicates a return spring for returning the plunger 64 to its initial position.

The opening and closing of the pressure passages 57 and 58 are determined by the stopping position of the valve element 71. Further, the opening and closing of the pressure passages 55 and 56 are determined by the stopping position of the valve element 72 linked with the valve element 71. The stopping positions of these valve elements 71 and 72 are designed to be changed by the magnitude of the control current to the electromagnetic coil 73. Note that reference numeral 74 is a return spring for returning the valve elements 71 and 72 to the initial positions.

Therefore, the electromagnetic volume control valve 9 is a variable discharge volume means for changing the discharge volume of the compressor 7 by changing the setting of the suction pressure (Ps) of the compressor 7 by the control current from the air-conditioner ECU 10. That is, the electromagnetic volume control valve 9 is constructed to be able to change the external force acting on the plunger 64 and the bellows 65 by applying the control current to the electromagnetic coil 69 in the valve body 47. By changing the relationship of the opening degree of the valve element 63 to the suction pressure (Ps), the actual post-evaporator temperature (TE) is controlled to the target post-evaporator temperature (TEO).

Figure 4:
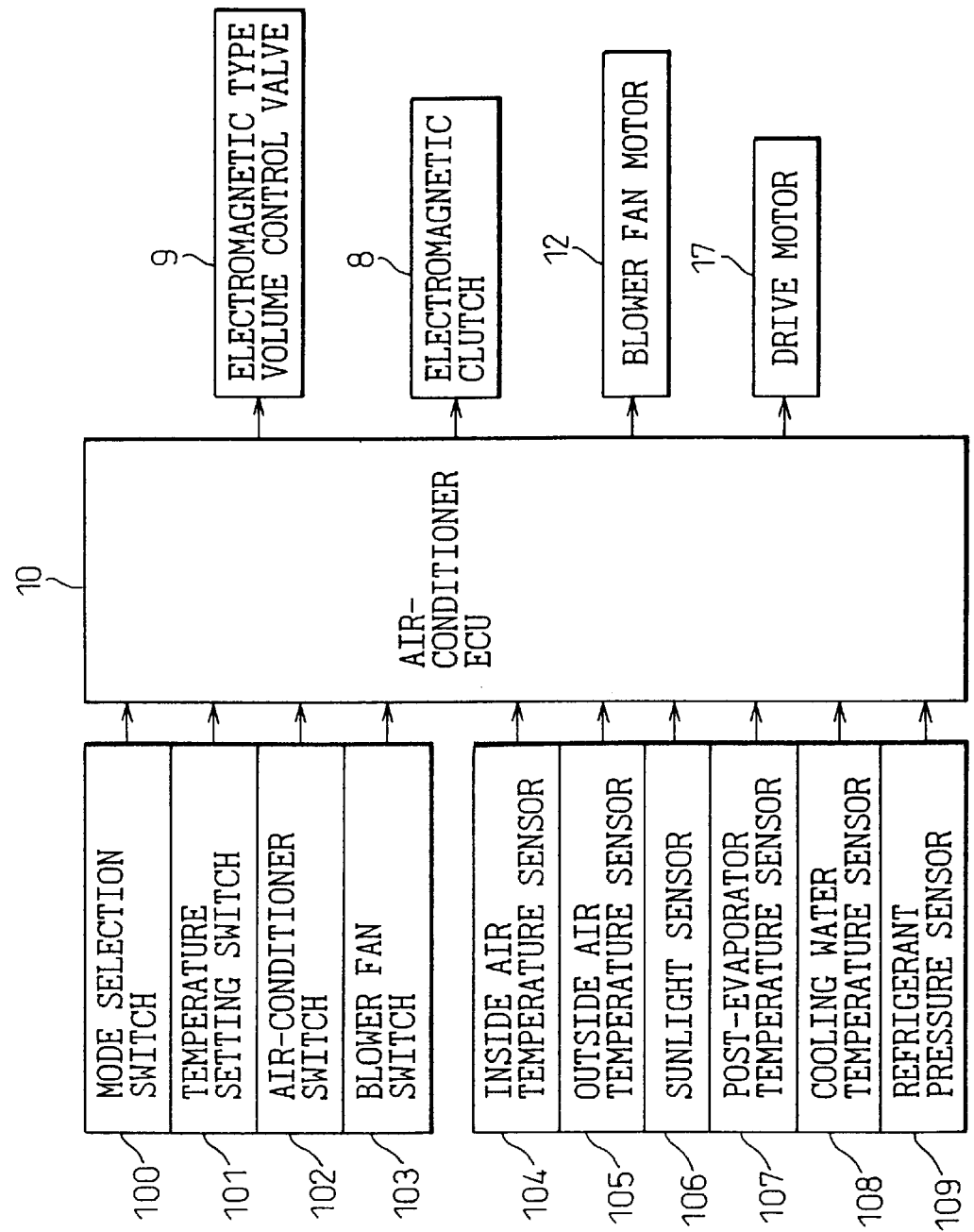
FIG. 4 is a block diagram of a control system of a vehicular use air-conditioning system according to the first embodiment of the present invention.

Next, an explanation will be given of the air-conditioner ECU 10 based on FIG. 1 and FIG. 4. Here, FIG. 4 is a view of the control system of the vehicular use air-conditioning system.

The air-conditioner ECU (heating control means) 10 for controlling the air-conditioning means in the air-conditioning unit 1 receives as input the switch signals from the switches on the air-conditioner operation panel (not shown) provided on the front panel of the passenger compartment. Note that on the air-conditioner operation panel are provided a mode selection switch 100 for switching the air-conditioning mode to either of a cooler mode (cooling operation) and heater mode (heating operation), a temperature setting switch (temperature setting means) 101 for setting the temperature in the passenger compartment to a desired temperature, an air-conditioner switch 102 for turning on or off the refrigeration cycle apparatus 20, a blower fan switch 103 for turning on or off the centrifugal blower fan 3, etc.

Further, in the inside of the air-conditioner ECU 10 is provided a known microprocessor comprised of a CPU, ROM, RAM, etc. Sensor signals from sensors are converted from an analog to digital format by a not shown input circuit, then input to the microprocessor. Note that the air-conditioner ECU 10 is designed so that when the ignition switch (key switch) controlling the start and stopping of the engine E of the vehicle is turned on (IG ON) and DC power is supplied from the power source in the vehicle, that is, the battery (not shown), the control processing is started.

The air-conditioner ECU 10 receives as its input sensor signals from the inside air temperature sensor (inside air temperature detecting means) 104 for detecting the air temperature in the passenger compartment (hereinafter referred to as the inside air temperature), an outside air temperature sensor (outside air temperature detecting means) 105 for detecting the air temperature of the outside of the passenger compartment (hereinafter referred to as the outside air temperature), a sunlight sensor (sunlight detecting means) 106 for detecting the amount of sunlight entering the passenger compartment, a post-evaporator temperature sensor (post-evaporator temperature detecting means) 107 for detecting the air temperature directly after passing through the evaporator 6 (hereinafter referred to as the post-evaporator temperature), a cooling water temperature sensor (cooling water temperature detecting means) 108 for detecting the temperature of the cooling water flowing into the heater core 5, and a refrigerant pressure sensor (high-side pressure detecting means) 109 for detecting the high-side pressure (discharge pressure: Pd) of the refrigeration cycle apparatus 20. Note that the above switches and sensors detect the air-conditioning environmental factors required for air-conditioning the passenger compartment of the vehicle.

Next, a brief explanation will be made of the control of the compressor capacity by the air-conditioner ECU 10 of the present embodiment based on FIG. 1 to FIG. 5. Here, FIG. 5 is a flow chart showing the method for control of the discharge volume by the air-conditioner ECU 10.

Figure 5:
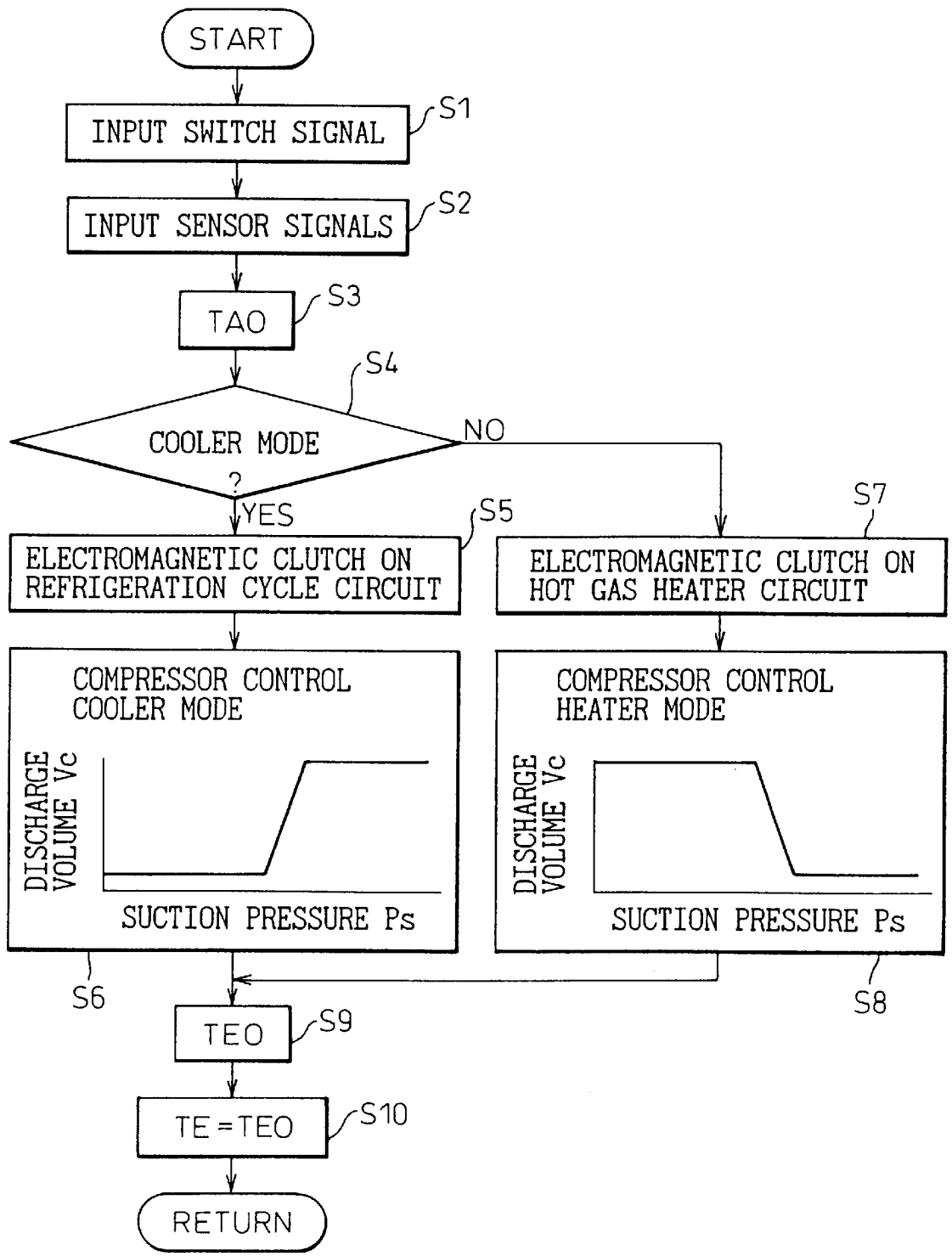
FIG. 5 is a flow chart of the method of control of the discharge volume by an air-conditioner ECU according to the first embodiment of the present invention.

When the ignition switch is turned on (IG ON) and DC power is supplied to the air-conditioner ECU 10, the routine of FIG. 5 is started. First, the switch signals are read from the switches on the air-conditioner operation panel (step S1). Next, the sensor signals are read (step S2). Specifically, the inside air temperature (TR) detected by the inside air temperature sensor 104, the outside air temperature (TAM) detected by the outside air temperature sensor 105, the sunlight (TS) detected by the sunlight sensor 106, the post-evaporator temperature (TE) detected by the post-evaporator temperature sensor 107), the cooling water temperature (TW) detected by the cooling water temperature sensor 108, and the discharge pressure (Pd) of the compressor 7 detected by the refrigerant pressure sensor 109.

Next, the target venting temperature (TAO) of the air vented to the passenger compartment is calculated based on the following equation (1) stored in advance in the ROM (step S3):

$$TAO = K_{set} \times T_{set} - KR \times TR - KAM \times TAM - KS \times TS + C \qquad (1)$$

Note that Tset is the temperature setting set by the temperature setting switch 10, TR is the inside air temperature detected by the inside air temperature sensor 104, TAM is the outside air temperature detected by the outside air temperature sensor 105, and TS is the sunlight detected by the sunlight sensor 106. Further, Kset, KR, KAM, and KS are gains, while C is a correction constant.

Next, it is judged if the air-conditioning mode is the cooler mode or not. Specifically, it is judged if the target venting temperature (TAO) is below a predetermined temperature or if the cooler mode has been set to by the mode selection switch 100 (step S4). If the result of the judgement is YES, the electromagnetic switch 8 is energized (ON), the first solenoid valve 23 opens, the second solenoid valve 24 closes, and the refrigeration cycle apparatus 20 is operated by the refrigeration cycle circuit 21 (step S5).

Next, the electromagnetic coil 73 of the electromagnetic volume control valve 9 is energized (ON) (step S6), After this, the routine proceeds to the processing of step S9. Accordingly, as shown in the illustration of step S6, the volume is controlled so that when the suction pressure (Ps) of the compressor 7 becomes lower, the discharge volume (Vc) of the compressor 7 is made smaller, while when the suction pressure (Ps) of the compressor 7 becomes higher, the discharge volume (Vc) of the compressor 7 is made larger.

Further, when the result of judgement of step S4 is NO, the electromagnetic clutch 8 is energized (ON), the first solenoid valve 23 closes, the second solenoid valve 24 opens, and the refrigeration cycle apparatus 20 is operated by the hot gas heater circuit 22 (step S7). Next, the electromagnetic coil 73 of the electromagnetic volume control valve 9 is deenergized (OFF) (step S8). Accordingly, as shown in the illustration of step S8, the volume is controlled so that when the suction pressure (Ps) of the compressor 7 becomes lower, the discharge volume (Vc) of the compressor 7 is increased, while when the suction pressure (Ps) of the compressor 7 becomes higher, the discharge volume (Vc) of the compressor 7 is made smaller.

Next, it is judged if the load is a cooling load or a heating load based on the target venting temperature (TAO). The target post-evaporator temperature (TEO) is decided from the cooling load or heating load. Specifically, it is calculated so that the higher the target venting temperature (TAO), the higher the target post-evaporator temperature (TEO) becomes (step S9). Next, the volume of the compressor 7 is controlled so that the actual post-evaporator temperature (TE) detected by the post-evaporator temperature sensor 107 becomes equal to the target post-evaporator temperature (TEO) (step S10). Specifically, the control current to the electromagnetic coil 69 of the electromagnetic volume control valve 9 is controlled. Next, the routine of FIG. 5 is gone through.

Figure 6:
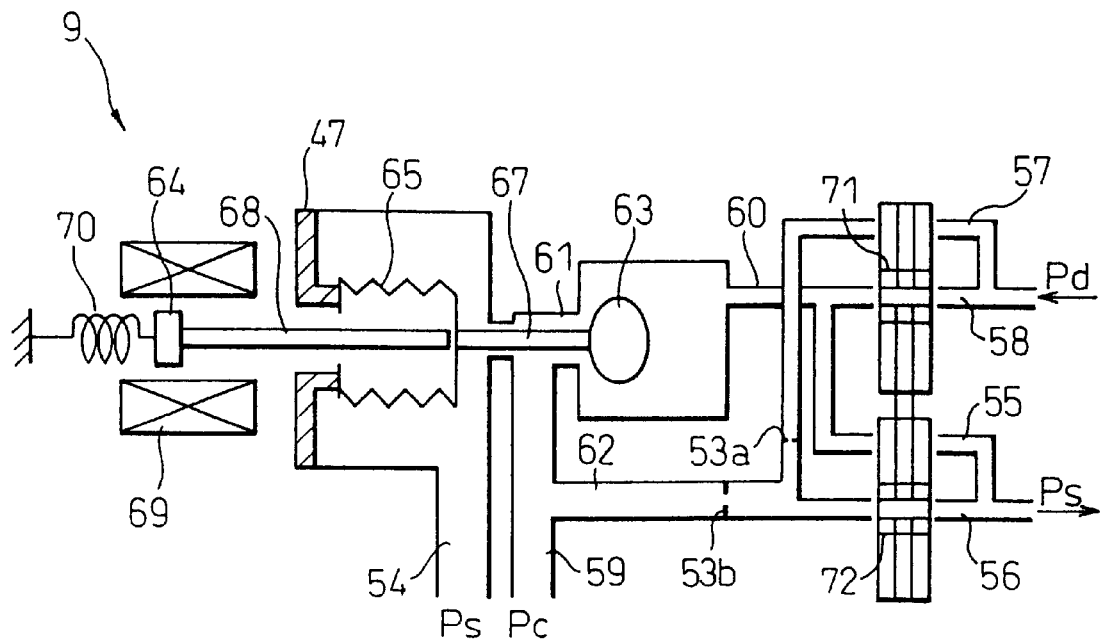
FIG. 6 is an explanatory view showing the state of operation of the electromagnetic volume control valve at the time of a cooler mode according to the first embodiment of the present invention.
Figure 7:
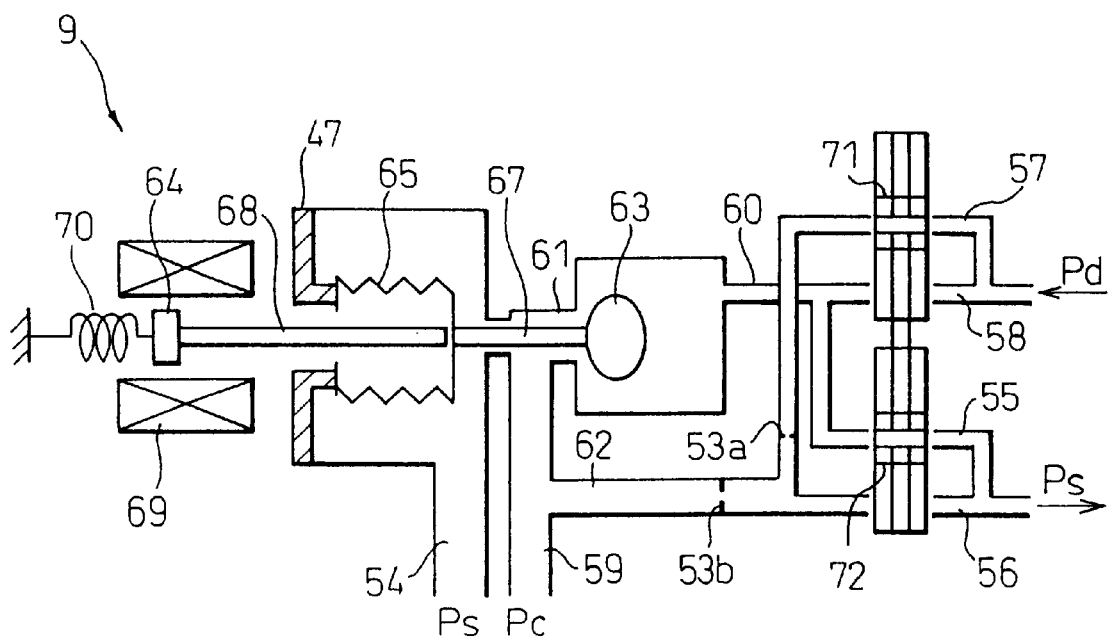
FIG. 7 is an explanatory view showing the state of operation of the electromagnetic volume control valve at the time of a heater mode according to the first embodiment of the present invention.

Next, the operation of the vehicular air-conditioning system of the present embodiment will be briefly explained based on FIG. 1 to FIG. 7. Here, FIG. 6 shows the state of operation of the electromagnetic volume control valve at the time of the cooler mode, while FIG. 7 shows the state of operation of the electromagnetic volume control valve at the time of the heater mode.

When the actual post-evaporator temperature (TE) has become considerably higher than the target post-evaporator temperature (TEO), the control current flowing through the electromagnetic coil 69 of the electromagnetic volume control valve 9 is made smaller and the setting of the suction pressure (Ps) of the compressor 7 is made smaller. In this case, the bellows 65 contracts and thereby the valve element 63 slightly displaces and the opening degree of the communication port 61 becomes smaller. Due to this, the discharge pressure (Pd) of the compressor 7 has difficulty entering the pressure passage 59 and the crank chamber pressure (Pc) becomes smaller. By the crank chamber pressure (Pc) becoming smaller, the inclination of the swash plate 41 of the compressor becomes larger, so the stroke of the piston 42 becomes longer. As a result, the discharge pressure (Pd) of the compressor 7 becomes higher, so the discharge volume (Vc) of the compressor 7 becomes larger.

Further, when the actual post-evaporator temperature (TE) becomes substantially equal to the target post-evaporator temperature (TEO), the control current flowing through the electromagnetic coil 69 of the electromagnetic volume control valve 9 is made larger and the setting of the suction pressure (Ps) of the compressor 7 is made larger. In this case, by the expansion of the bellows 65, the valve element 63 displaces by a large amount and the opening degree of the communication port 61 becomes larger. Due to this, the discharge pressure (Pd) of the compressor 9 enters the pressure passage 59 and the crank chamber pressure (Pc) becomes larger. Further, by the crank chamber pressure (Pc) becoming larger, the inclination of the swash plate 41 of the compressor becomes smaller and therefore the stroke of the piston 42 becomes shorter. As a result, since the discharge pressure (Pd) of the compressor 7 becomes lower, the discharge pressure (Vc) of the compressor 7 becomes smaller.

Further, when the air-conditioning mode is the cooler mode, the electromagnetic clutch 8 is turned on, the first solenoid valve 23 opens, and the second solenoid valve 24 closes. Accordingly, the high temperature, high pressure gas phase refrigerant discharged from the compressor 7 circulates through the refrigeration cycle circuit 21 and flows into the evaporator 6. The air sucked into the air-conditioning duct 2 is heat exchanged with the low temperature, low pressure refrigerant and cooled by the evaporator 6 and then vented into the passenger compartment. The passenger compartment is cooled by this.

When the air-conditioning mode is the cooler mode, the electromagnetic coil 73 of the electromagnetic volume control valve 9 is energized (ON), so as shown in FIG. 6, the valve elements 71 and 72 displace downward in the figure against the force of the return spring 74, whereby the pressure passage 56 and the communication passage 62 are communicated and the pressure passage 58 and the communication passage 60 are communicated. Therefore, the discharge pressure (Pd) is led to the valve element 63, so the lower the suction pressure (Ps) of the compressor 7 becomes, the more the valve element 63 displaces to the valve opening side, the larger the opening degree of the communication port 61 becomes, and the higher the crank chamber pressure (Pc) of the compressor 7 becomes.

Due to this, when the suction pressure (Ps) is a low pressure of less than a preset first predetermined pressure (for example, a gauge pressure of 2 kg/cm$^2$), the valve element 63 opens, the crank chamber pressure (Pc) rises due to the discharge pressure (Pd), and the discharge volume (Vc) of the compressor 7 is controlled to 5% volume. Further, when the suction pressure (Ps) is a high pressure of more than a preset second predetermined pressure (for example, a gauge pressure of 2.1 kg/cm$^2$), the valve element 63 closes fully, the crank chamber pressure (Pc) becomes equal to the suction pressure (Ps), and the discharge volume (Vc) of the compressor 7 is controlled to 100% volume.

Further, when the suction pressure (Ps) becomes higher than the first predetermined pressure and lower than the second predetermined pressure, the valve element 63 displaces to the valve-closing side. The crank chamber pressure (Pc) becomes higher than the suction pressure (Ps), the discharge pressure (P) is approached, and therefore the discharge volume (Vc) of the compressor 7 changes (see step S6 in FIG. 5).

Further, when the air-conditioning mode is the heater mode, the electromagnetic clutch 8 is turned on, the first solenoid valve 23 closes, and the second solenoid valve 24 opens. Further, the hot water valve 15 also opens. Accordingly, the high temperature, high pressure gas phase refrigerant discharged from the compressor 7 circulates through the hot gas heater circuit 22 and flows into the evaporator 6. Further, the cooling water absorbing the exhaust heat of the engine E circulates through the cooling water circulation circuit 14 and flows into the heater core 5. Further, the air sucked into the air-conditioning duct 2 is heat exchanged by the high temperature, low pressure refrigerant at the evaporator 6 and further is heat exchanged with the high temperature cooling water at the heater core 5 to be further heated then is vented into the passenger compartment. The passenger compartment is heated by this.

Since the electromagnetic coil 73 of the electromagnetic volume control valve 9 is deenergized (OFF), as shown in FIG. 6, the valve elements 71 and 72 displace upward in the illustration due to the force of the return spring 74, so the pressure passage 55 and the communication passage 60 are communicated and the pressure passage 57 and the communication passage 62 are communicated. Therefore, the suction pressure (Ps) is led to the valve element 63, so the lower the suction pressure (Ps) of the compressor 7, the more the valve element 63 displaces to the valve opening side, the opening degree of the communication port 61 becomes larger, and the crank chamber pressure (Pc) of the compressor 7 becomes lower.

Due to this, when the suction pressure (Ps) is a low pressure of less than the preset first predetermined pressure (for example, a gauge pressure 3 kg/cm$^2$), the valve element 63 fully opens, the crank chamber pressure (Pc) becomes equal to the suction pressure (Ps), and the discharge volume (Vc) of the compressor 7 is controlled to 100% volume. Further, when the suction pressure (Ps) is a high pressure of less than the preset second predetermined pressure (for example, a gauge pressure of 3.1 kg/cm$^2$), the valve element 63 closes, the crank chamber pressure (Pc) becomes higher than the discharge pressure (Pd), and the discharge volume (Vc) of the compressor 7 is controlled to 5% volume.

Further, when the suction pressure (Ps) is higher than the first predetermined pressure and lower than the second predetermined pressure, the valve element 63 displaces to the valve closing side, the crank chamber pressure (Pc) becomes higher than the suction pressure (Ps), and the discharge pressure (Pd) is approached, whereby the discharge volume (Vc) of the compressor 7 changes (see step S8 in FIG. 5).

As explained above, the vehicular air-conditioning system controls the air cooling performance (cooling performance) of the evaporator 6, the air heating performance (auxiliary heating performance) of the evaporator 6, and the discharge pressure (Pd) of the compressor 7 to the optimum values by adjusting the discharge volume of the compressor 7 by the electromagnetic volume control valve 9 in accordance with the cooling load and the heating load without turning the electromagnetic clutch 8 on and off. By this, there is no frequent repeated turning on and off of the compressor 7, so the compressor 7 does not fluctuate largely in torque. Accordingly, the rotational speed of the engine E for belt driving the compressor 7 does not fluctuate by a large degree, so the acceleration performance or slope climbing performance and other power performance and drivability of the vehicle do not deteriorate.

When the air-conditioning mode is a cooler mode, due to the use of the electromagnetic volume control valve 9 of the present embodiment, when the cooling load becomes smaller and the suction pressure (Ps) of the compressor 7 becomes lower, the discharge volume (Vc) of the compressor 7 becomes smaller. Accordingly, the cooling performance of the evaporator 6 falls, so it is possible to suppress the occurrence of an excessive cooling capacity or the occurrence of frost in the evaporator 6.

Further, when the air-conditioning mode is the heater mode, if the heating load is large, for example, at the time of startup of the hot water type heating system 4 in a low temperature environment where the outside air temperature is less than a predetermined temperature (for example, 0° C.), when low temperature air is sucked into the evaporator 6, the low temperature air is heat exchanged at the evaporator 6, so the temperature and pressure of the refrigerant fall. Due to this, the suction pressure (Ps) of the compressor 7 falls. By using the electromagnetic volume control valve 9 of the present embodiment, however, even if the suction pressure (Ps) of the compressor 7 falls, the discharge volume (Vc) of the compressor 7 becomes larger. Therefore, by the increase of the flow rate of the circulation of the refrigerant through the hot gas heater circuit 22, the flow rate of the refrigerant into the evaporator 6 increases. Accordingly, even when the cooling heat load is large, a sufficient auxiliary heating performance can be exhibited.

When the air-conditioning mode is the heater mode, due to use of the electromagnetic volume control valve 9 of the present embodiment, if the heating load becomes smaller and the suction pressure (Ps) of the compressor 7 becomes higher, the discharge volume (Vc) of the compressor 7 becomes smaller. Accordingly, the auxiliary heating performance at the evaporator 6 falls and the discharge pressure (Pd) of the compressor 7 becomes lower. Due to this, it is possible to prevent the inside air temperature from becoming higher than the temperature setting and the auxiliary heating capacity becoming excessive or the refrigerant piping and other cycle parts (refrigeration equipment) used in the refrigeration cycle apparatus 20 from breaking down or breaking.

Figure 8:
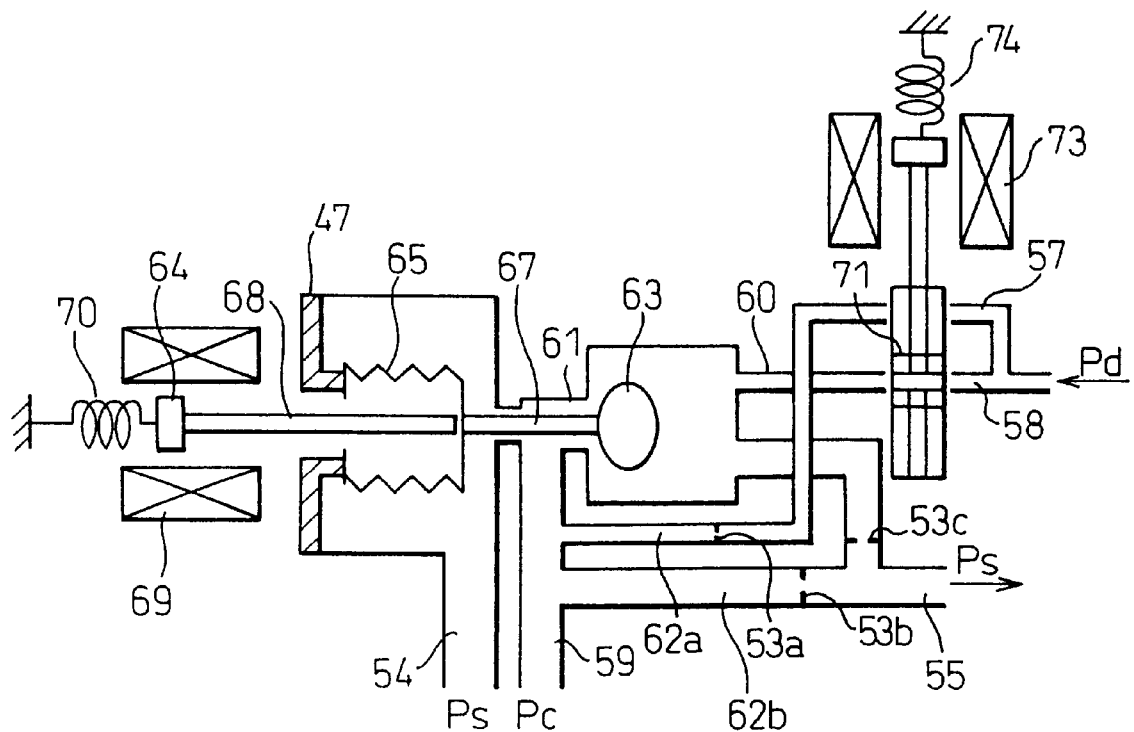
FIG. 8 is an explanatory view showing the general structure of an electromagnetic type volume control valve according to a second embodiment of the present invention.

FIG. 8 shows a second embodiment of the present invention and shows the general structure of the electromagnetic volume control valve housed in the compressor.

The electromagnetic volume control valve 9 of the present embodiment is a simplification of the first embodiment. Fixed calibrated orifices 53*a* and 53*b* are arranged in the communication passages 62*a* and 62*b* in the refrigerant pressure circuit and the fixed calibrated orifice 53*c* is arranged in the pressure passage 55. The electromagnetic volume control valve 9 energizes (turns ON) the electromagnetic coil 73 when the air-conditioning mode is the cooler mode. Accordingly, as shown in FIG. 8, the valve element 71 displaces downward in the figure against the force of the return spring 74 whereby the pressure passage 58 and communication passage 60 are communicated.

Due to this, when the suction pressure (Ps) is a high pressure of more than a preset second predetermined pressure, the valve element 63 displaces to the most closed side, the crank chamber pressure (Pc) becomes equal to the suction pressure (Ps), and the discharge volume (Vc) of the compressor 7 is controlled to 100% volume. Further, when the suction pressure (Ps) is higher than the preset first predetermined pressure and lower than the second predetermined pressure, the valve element 63 displaces to the valve opening side, the crank chamber pressure (Pc) becomes higher than the suction pressure (Ps), and the discharge pressure (Pd) is approached. Due to this, change is possible so that the lower the suction pressure (Ps) becomes, the smaller the discharge volume (Vc) of the compressor 7 becomes.

The electromagnetic volume control valve 8 deenergizes the electromagnetic coil 73 (turns it OFF) when the air-conditioning mode is the heater mode. Accordingly, the valve element 71 displaces upward in the figure due to the force of the return spring 74, whereby the pressure passage 57 and the communication passage 62*a* are communicated. Due to this, when the suction pressure (Ps) is a low pressure of less than the preset first predetermined pressure, the valve element 63 fully opens, the crank chamber pressure (Pc) becomes equal to the suction pressure (Ps), and the discharge volume (Vc) of the compressor 7 is controlled to 100% volume. Further, when the suction pressure (Ps) is higher than the first predetermined pressure and is lower than the second predetermined pressure, the valve element 63 displaces to the valve closing side, the crank chamber pressure (Pc) becomes higher than the suction pressure (Ps), and the discharge pressure (Pd) is approached. Due to this, control is possible so that the higher the suction pressure (Ps) becomes, the smaller the discharge volume (Vc) of the compressor 7 becomes.

Figure 9:
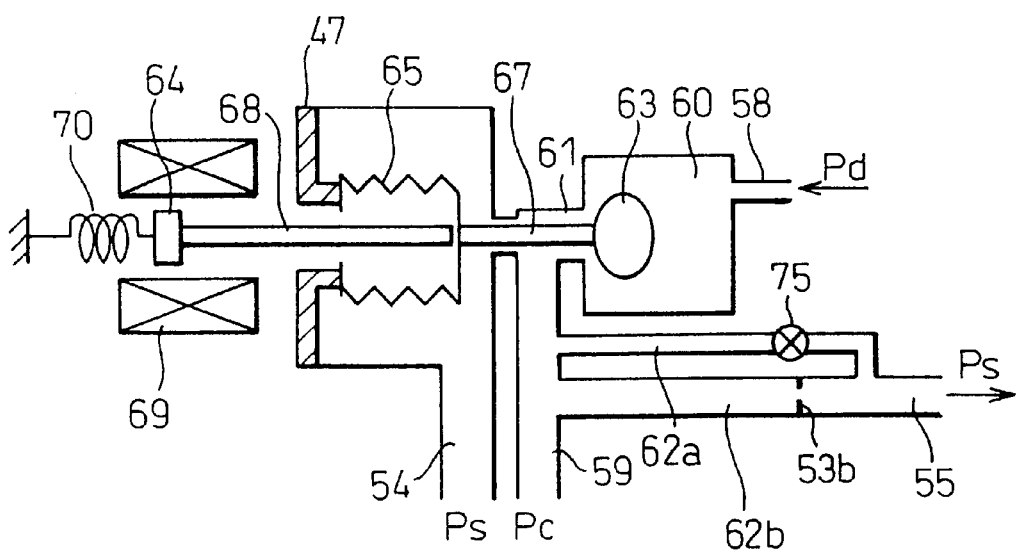
FIG. 9 is an explanatory view showing the general structure of an electromagnetic type volume control valve according to a third embodiment of the present invention.

FIG. 9 shows a third embodiment of the present invention and shows the general structure of the electromagnetic volume control valve housed in the compressor.

The electromagnetic volume control valve 9 of the present embodiment directly communicates the communication port 61 and the pressure passage 58 by the communication passage 60, communicates the pressure passage 59 and pressure passage 55 by the communication passages 62a and 62b, and disposes the solenoid valve 75 in the communication passage 62a and therefore is configured to control the discharge volume (Vc) to 100% fixed volume when the air-conditioning mode is the heater mode.

Further, in the cooler mode, by deenergizing (turning OFF) the solenoid valve 75 and causing the valve to close, the result is a refrigerant pressure circuit similar to the cooler mode of the first embodiment. Further, in the heater mode, by energizing (turning ON) the solenoid valve 75 and causing the valve to open, it is configured to similarly control the crank chamber pressure (Pc) to the suction pressure (Ps) at all times and thereby fix the discharge volume (Vc) to 100% volume regardless of the level of the suction pressure (Ps).

Figure 10:
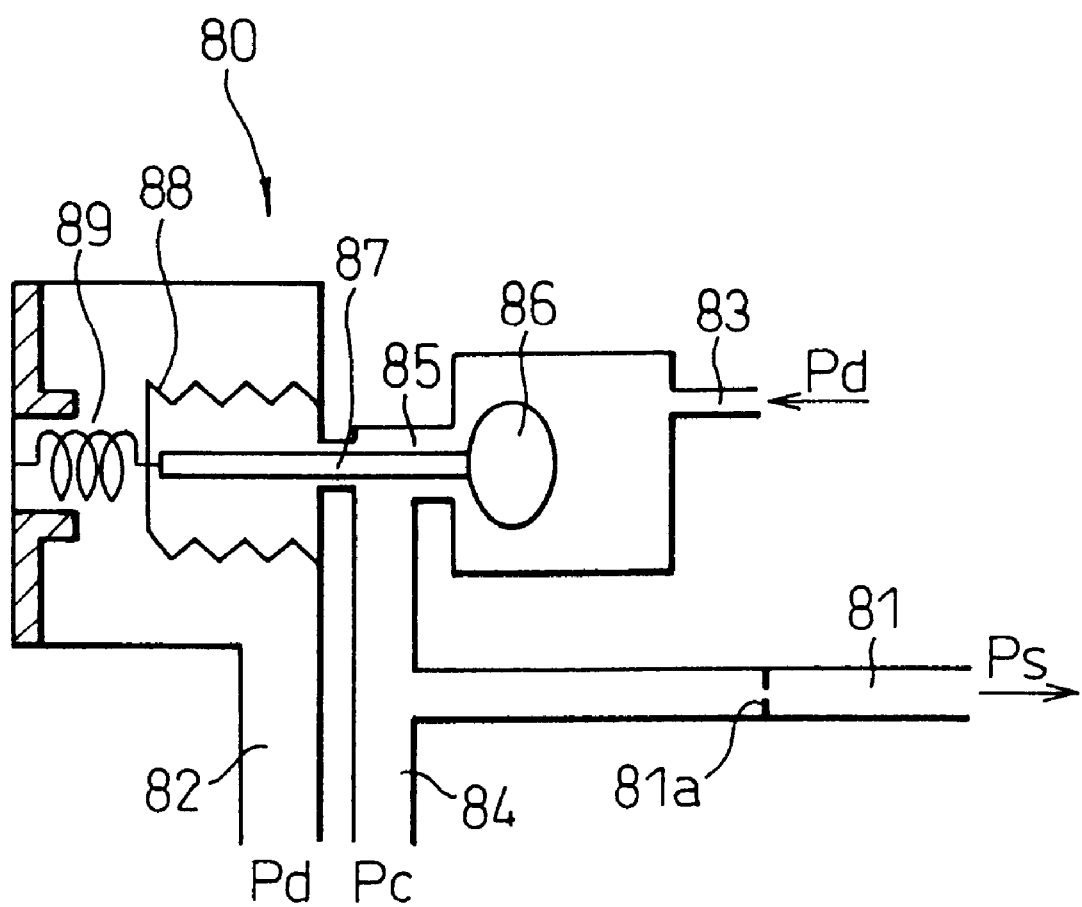
FIG. 10 is an explanatory view showing the general structure of an electromagnetic type volume control valve according to a fourth embodiment of the present invention.
Figure 11:
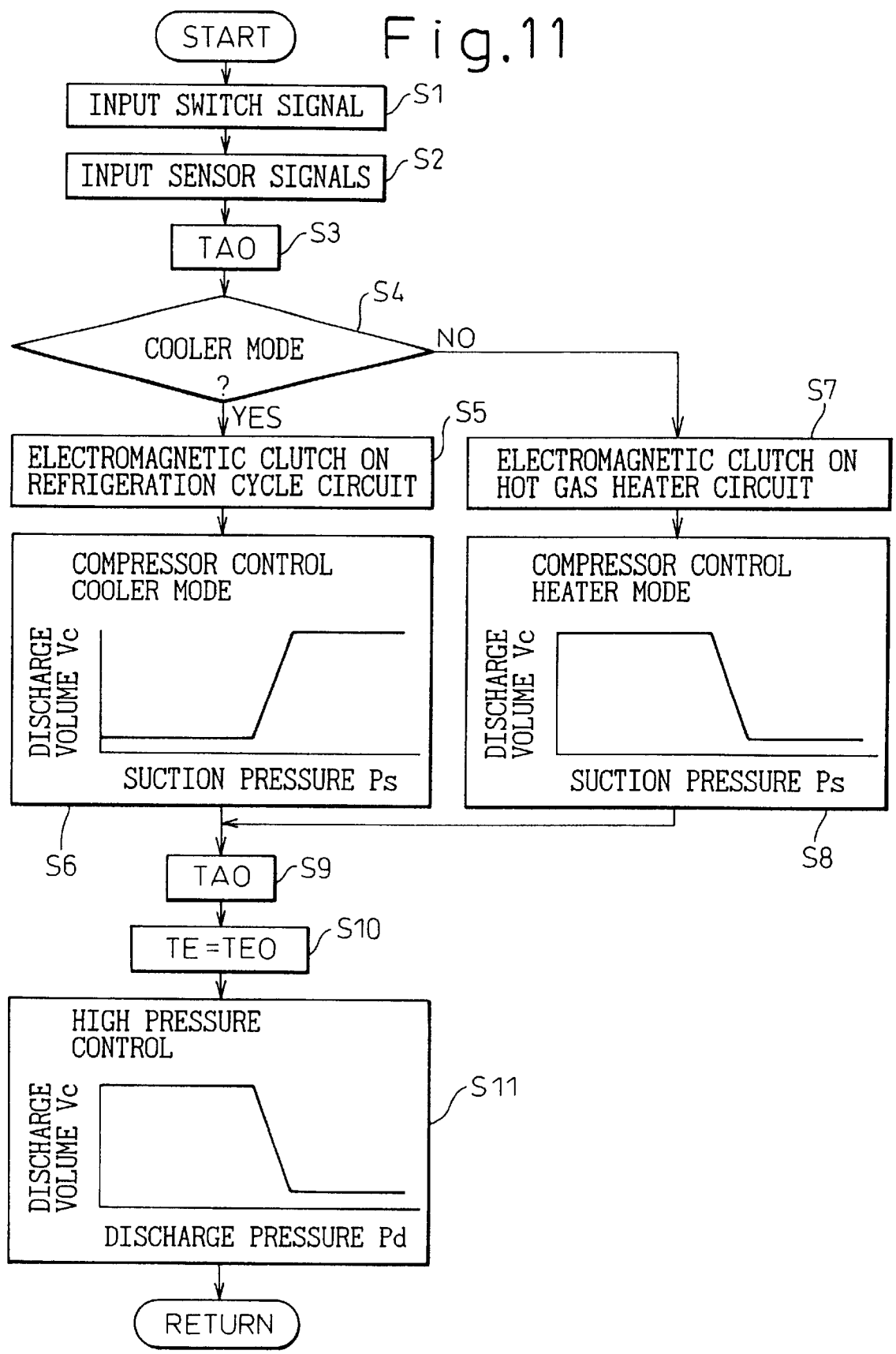
FIG. 11 is a flow chart of the method of control of the discharge volume by an air-conditioner ECU according to the fourth embodiment of the present invention.

FIG. 10 and FIG. 11 show a fourth embodiment of the present invention. FIG. 10 shows a general structure of the electromagnetic type volume control valve housed in the compressor.

The electromagnetic type volume control valve 9 of the present embodiment provides a high pressure control valve for changing the discharge volume (Vc) of the compressor 7 in parallel with the object of protecting the refrigerant piping and other cycle parts at the time of high pressure of the discharge pressure (Pd) of the compressor 7 and suppressing the fluctuations in the rotational speed of the engine E when turning the compressor from ON to OFF in state.

Further, the refrigerant pressure circuit of the high pressure control valve 80 is provided with the pressure passage 81 for guiding the suction pressure (Ps) of the compressor 7, the pressure passages 82 and 83 for guiding the discharge pressure (Pd) of the compressor 7, a pressure passage 84 for giving a crank chamber pressure (Pc) to the crank chamber 52 of the compressor 7, and a communication passage 85 for communicating the pressure passages 83 and 84. Note that the pressure passage 81 is provided with a fixed calibrated orifice 81a. Further, the opening degree of the communication port 85 is determined by the stopping position of the valve element 85. The stopping position of the valve element 86 is determined by the displacement position of the rod 87 and the bellows 88. Note that reference numeral 89 is return spring for returning the bellows to the initial position.

Next, the control of the compressor capacity by the air-conditioner ECU 10 of the present embodiment will be briefly explained based on FIG. 10 and FIG. 11. Here, FIG. 11 is a flow chart of the method of control of the discharge volume by the air-conditioner ECU 10.

The processing of step S10 of the flow chart of FIG. 5 in the first embodiment is performed, then the high pressure control valve 80 is used to control the discharge volume (Vc) (step S11). Due to this, when the discharge pressure (Pd) given to the pressure passage 82 rises from the preset working pressure of the bellows 88, the valve element 86 opens and opens the communication port 85 and the crank chamber pressure (Pc) rises.

Accordingly, when the discharge pressure (Pd) of the compressor 7 is a low pressure of less than a first predetermined pressure (for example, a gauge pressure of 20 $kg/cm^2$), the discharge volume (Vc) of the compressor 7 is controlled to become 100% volume. Further, when the discharge pressure (Pd) of the compressor 7 is higher than the first predetermined pressure and lower than a second predetermined pressure (for example, a gauge pressure of 22 $kg/cm^2$), control is performed so that the higher the discharge pressure (Pd), the smaller the discharge volume (Vc) becomes. Further, when the discharge pressure (Pd) of the compressor 7 is a high pressure of more than the second predetermined pressure, the discharge volume (Vc) of the compressor 7 is controlled to for example 5% volume.

Figure 12:
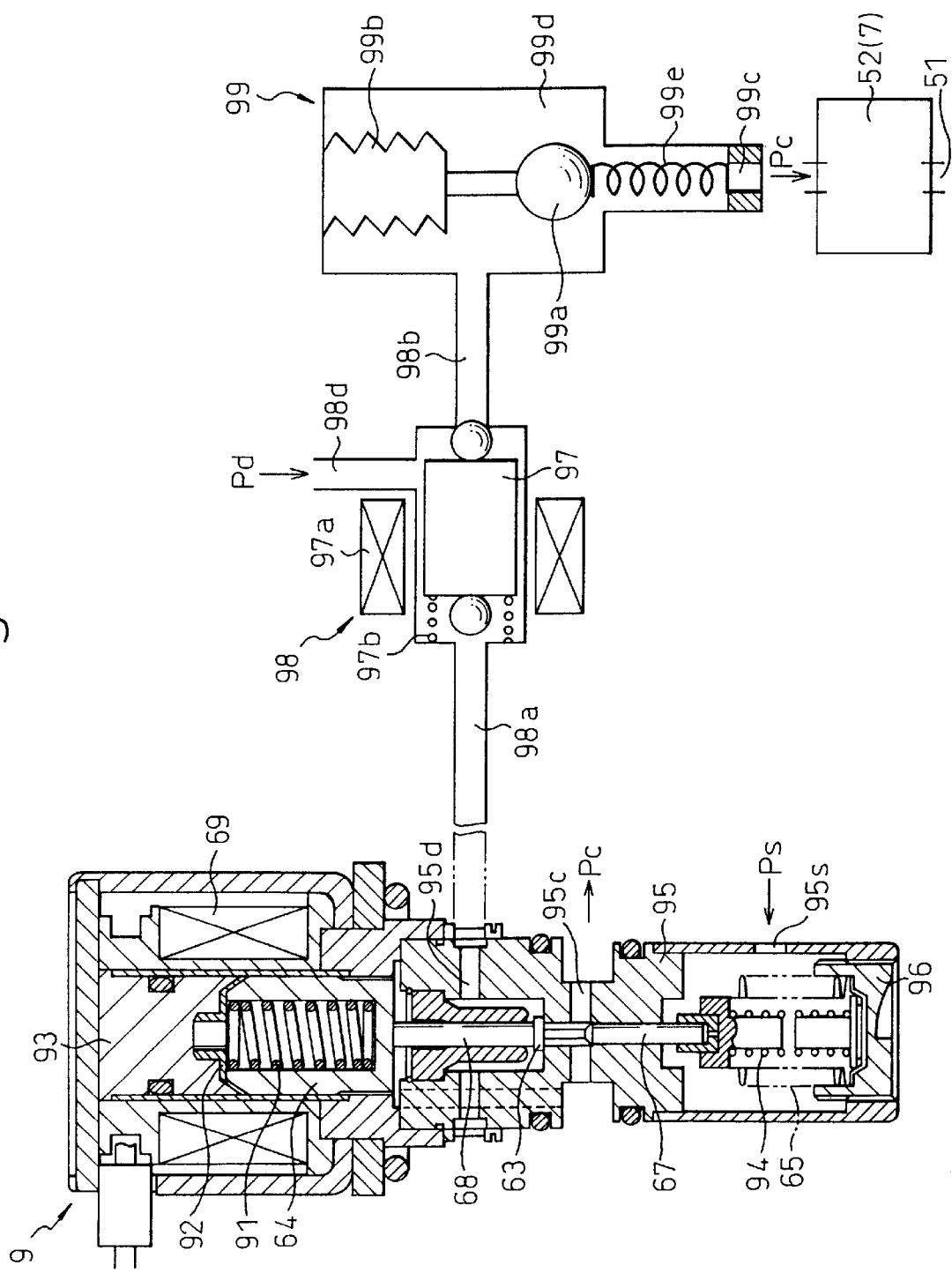
FIG. 12 is an explanatory view showing the general structure of an electromagnetic type volume control valve, switching control valve, and hot gas volume control valve according to a fifth embodiment of the present invention.

FIG. 12 and FIG. 13 shows a fifth embodiment of the present invention. FIG. 12 shows the general structure of the electromagnetic type volume control valve housed in the compressor, the switching control valve, and the hot gas volume control valve.

The electromagnetic type volume control valve 9 of the present embodiment is a variable volume control means for the cooler mode. The electromagnetic type volume control valve 9 is provided with a return spring 91 for returning the plunger 64 to the initial position, the spring seat 92 of the return spring 91, and the adjustment cock 93 for adjusting the amount of displacement of the plunger 64. Further, inside the bellows 65 is provided a return spring 94 for returning the bellows 65 to the initial position.

Further, at the end of the valve body 95 of the electromagnetic type volume control valve 9 is provided a cock 96 for setting the initial load of the return spring 94. Note that the valve body 95 is formed with a pressure passage 95c for giving the crank chamber pressure (Pc) to the crank chamber 52 of the compressor 7, a pressure passage 95d for guiding the discharge pressure (Pd) of the compressor 7, and a pressure passage 95s for guiding the suction pressure (Ps) of the compressor 7.

The refrigerant pressure circuit communicating with the electromagnetic type volume control valve 9 has disposed in it a switching control valve 98 for changing the stopping position of the valve element 97 between the cooler mode and the heater mode and a variable volume control means for the heater mode, that is, the hot gas volume control valve 99. The switching control valve 98 has a valve element 97, an electromagnetic coil 97a, and a return spring 97b. The switching control valve 98 is formed with a communication passage 98a for communicating with the pressure passage 95d, a communication passage 98b for communicating with the hot gas volume control valve 99, and a pressure passage 98d for guiding the discharge pressure (Pd) of the compressor 7.

Further, the hot gas volume control valve 99 has a valve element 99a and a bellows 99b. The hot gas volume control valve 99 is formed with a pressure passage 99c for giving a crank chamber pressure (Pc) to the crank chamber 52 of the compressor 7. Note that the pressure passage 99c communicates with the discharge port 51 through the crank chamber 52. Further, reference numeral 99e is a return spring for returning the valve element 99a and bellows 99b to the initial position.

In the present embodiment, when the air-conditioning mode is the cooler mode, the electromagnetic coil 97a of the switching control valve 98 is deenergized (OFF) and the valve element 97 displaces upward in the figure due to the force of the return spring 97b to close the communication passage 98b. Due to this, the discharge pressure (Pd) of the compressor 7 is guided to the pressure passage 95d of the electromagnetic type volume control valve 9.

Figure 13A:
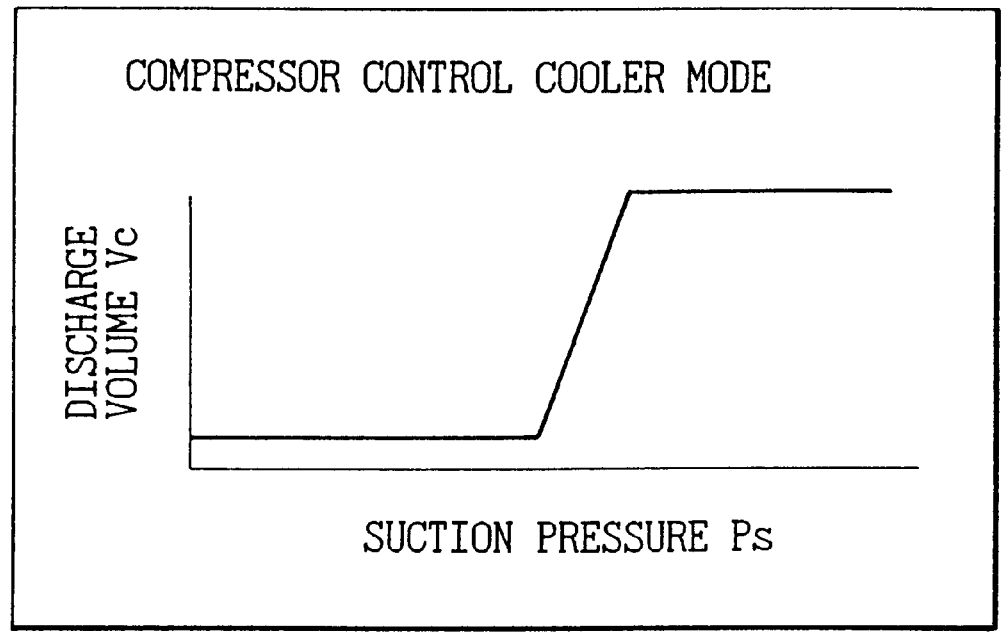

Further, when the suction pressure (Ps) given to the pressure passage 95s is a high pressure of more than the second predetermined pressure (for example, a gauge pressure of 2.1 kg/cm$^2$), as shown in FIG. 13A, the bellows 65 contracts and the valve element 63 closes, whereby the crank chamber pressure (Pc) becomes equal to the suction pressure (Ps) and the discharge volume (Vc) of the compressor 7 becomes 100% volume. Further, when the suction pressure (Ps) is a low pressure of less than the first predetermined pressure (for example, a gauge pressure of 2 kg/cm$^2$), as shown in FIG. 13A, the bellows 65 expands and the valve element 63 opens, whereby the crank chamber pressure (Pc) becomes equal to the discharge pressure (Pd) and the discharge volume (Vc) of the compressor 7 becomes 5% volume. Note that when the suction pressure (Ps) is higher than the first predetermined pressure and lower than the second predetermined pressure, as shown in FIG. 13A, the discharge volume (Vc) of the compressor 7 is continuously changed from 5% volume to 100% volume the higher the suction pressure (Ps).

Further, when the air-conditioning mode is the heater mode, the electromagnetic coil 97a of the switching control valve 98 is energized (ON) and the valve element 97 displaces downward in the illustration to close the communication passage 98a. Due to this, the discharge pressure (Pd) of the compressor 7 is guided into the control chamber 99d of the hot gas volume control valve 99. Further, when the discharge pressure (Pd) given to the control chamber 99d is a low pressure of less than the first predetermined pressure (for example, a gauge pressure of 20 kg/cm$^2$), as shown in FIG. 13B, the bellows 99b expands and the valve element 99a closes, whereby the crank chamber pressure (Pc) becomes equal to the suction pressure (Ps) and the discharge volume (Vc) of the compressor 7 becomes 100% volume.

Figure 13B:
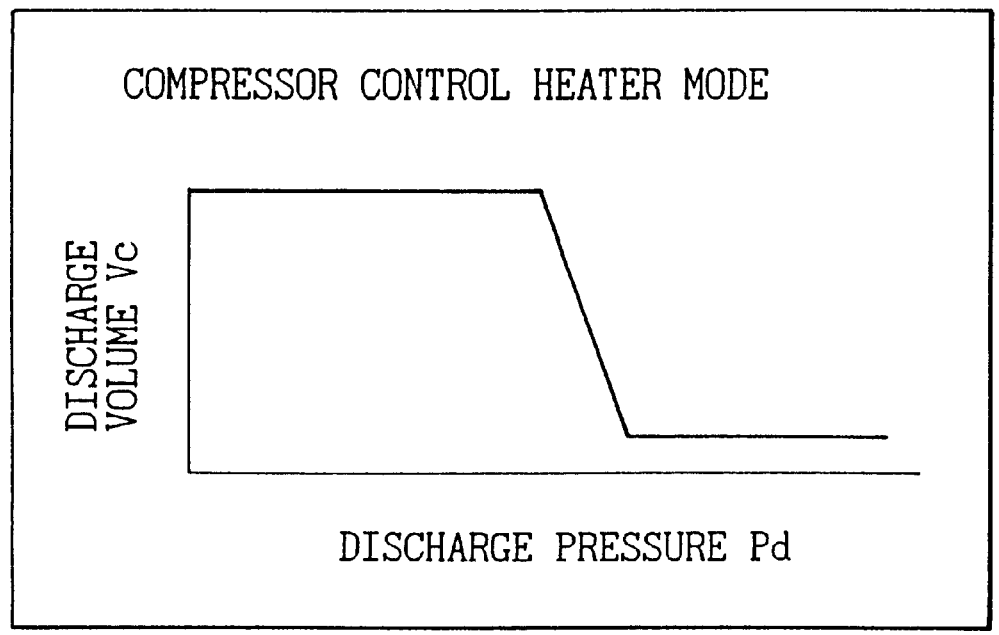
FIG. 13B is a graph of the relationship between the discharge pressure and discharge volume of the compressor.

Further, when the discharge pressure (Pd) given to the control chamber 99d is a high pressure of more than the second predetermined pressure (for example, a gauge pressure of 22 kg/cm$^2$) as shown in FIG. 13B, the bellows contracts and the valve element 99a opens, whereby the crank chamber pressure (Pc) becomes equal to the discharge pressure (Pd) and the discharge volume (Vc) of the compressor 7 becomes 5% volume. Note that when the suction pressure (Ps) is higher than the first predetermined pressure and lower than the second predetermined pressure, as shown in FIG. 13B, the discharge volume (Vc) of the compressor 7 is continuously changed from 100% volume to 5% volume the higher the discharge pressure (Pd).

Figure 14:
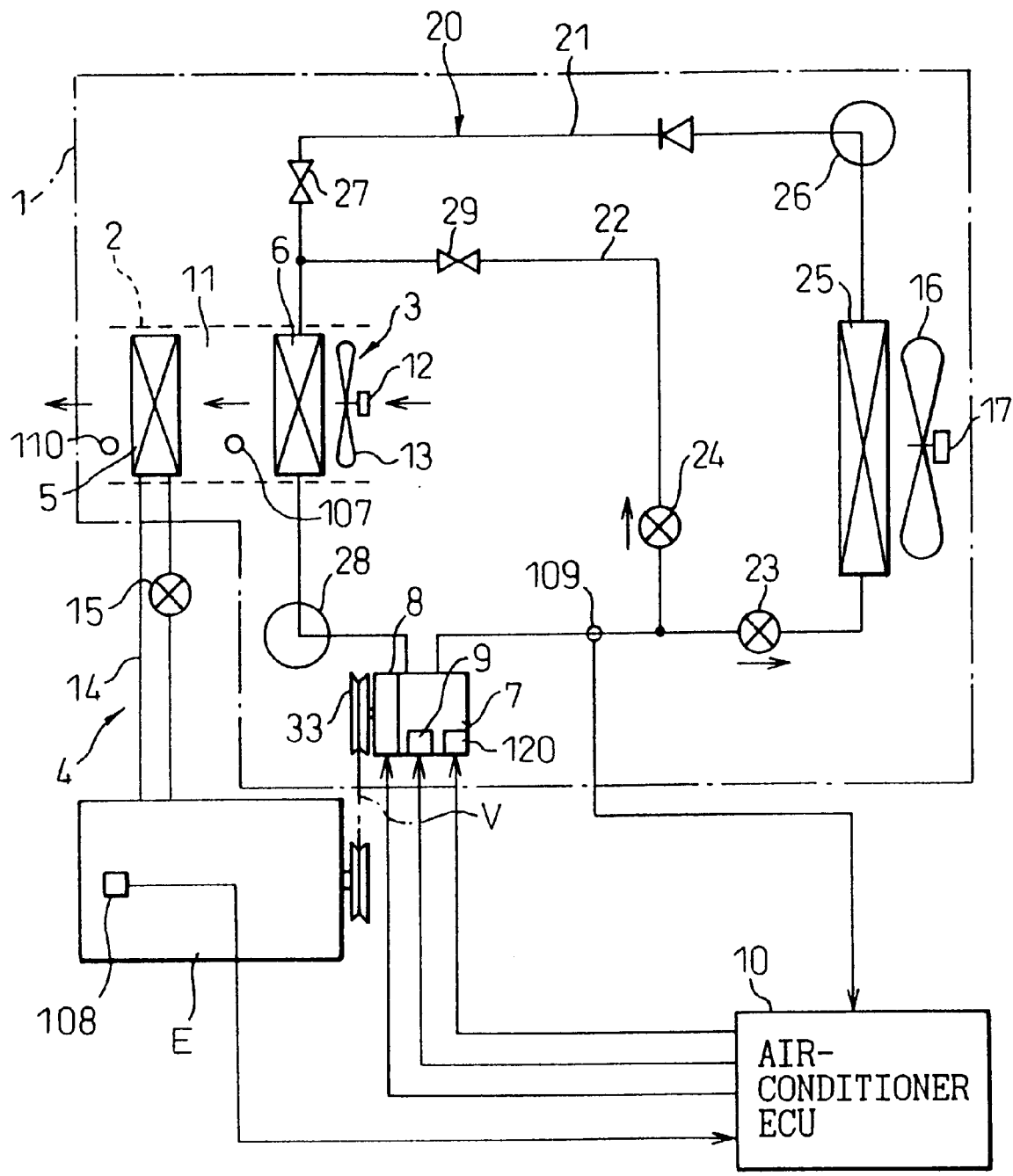
FIG. 14 is a view of the overall structure of a vehicular use air-conditioning system according to a sixth embodiment of the present invention.
Figure 15:
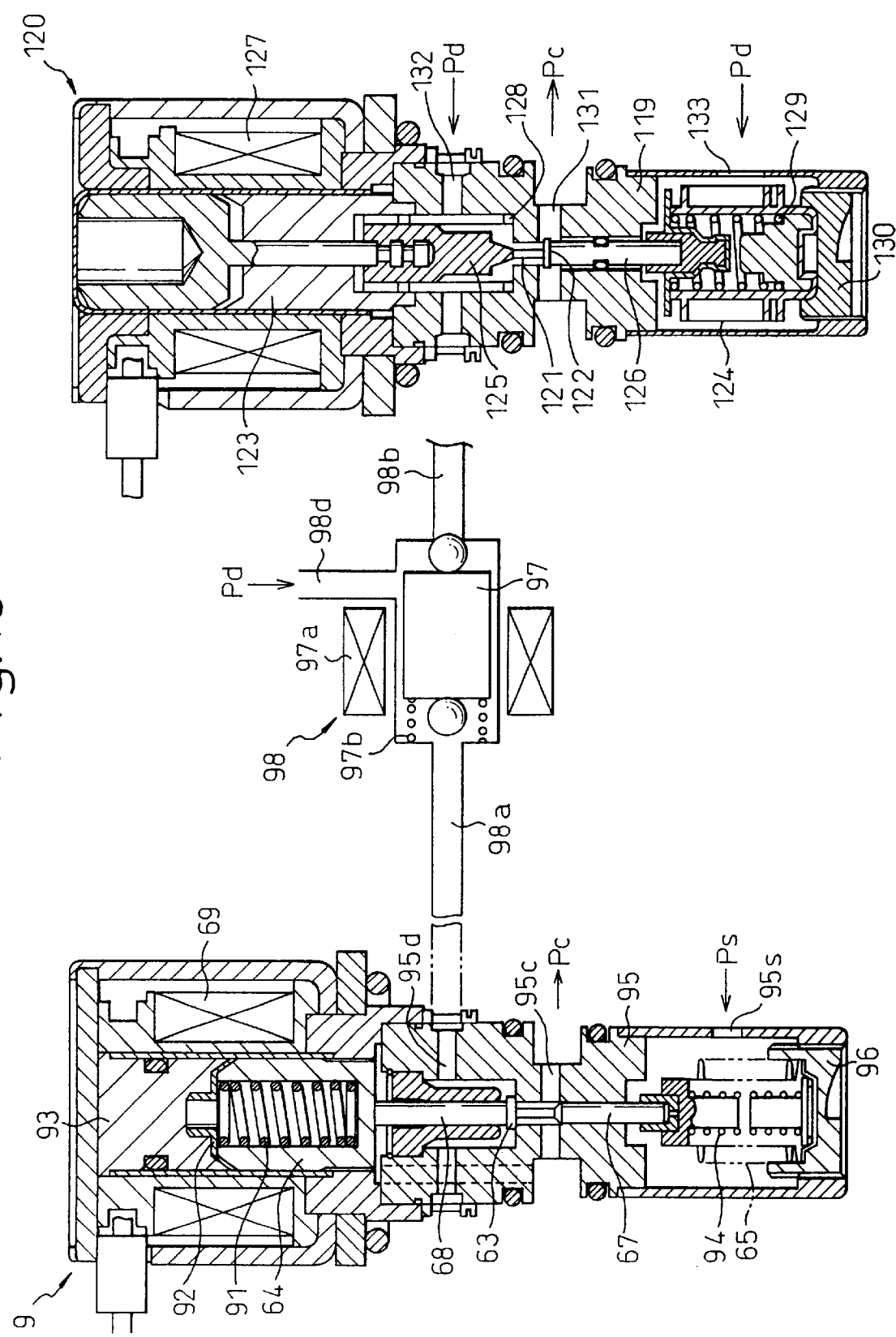
FIG. 15 is an explanatory view of the general structure of an electromagnetic type volume control valve, switching control valve, and high pressure control valve according to a sixth embodiment of the present invention.
Figure 16:
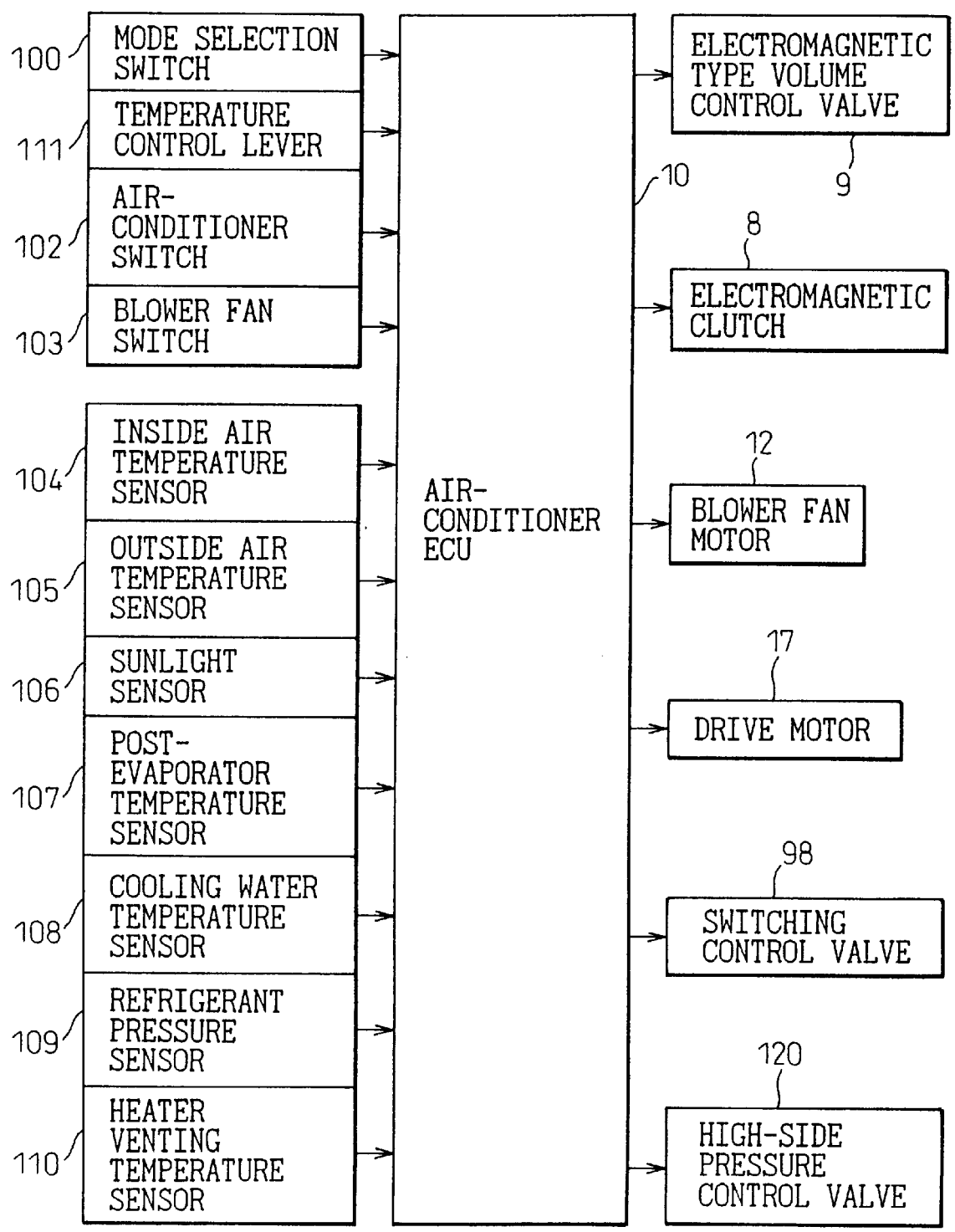
FIG. 16 is a block diagram of the control system of a vehicular use air-conditioning system.

FIG. 14 to FIG. 17 show a sixth embodiment of the present invention. FIG. 14 is a view of the overall structure of the vehicular air-conditioning system, FIG. 15 is a view of the general structure of the electromagnetic type volume control valve housed in the compressor, the switching control valve, and the high pressure control valve, and FIG. 16 is a view of the control system of a vehicular air-conditioning system.

Figure 17A:
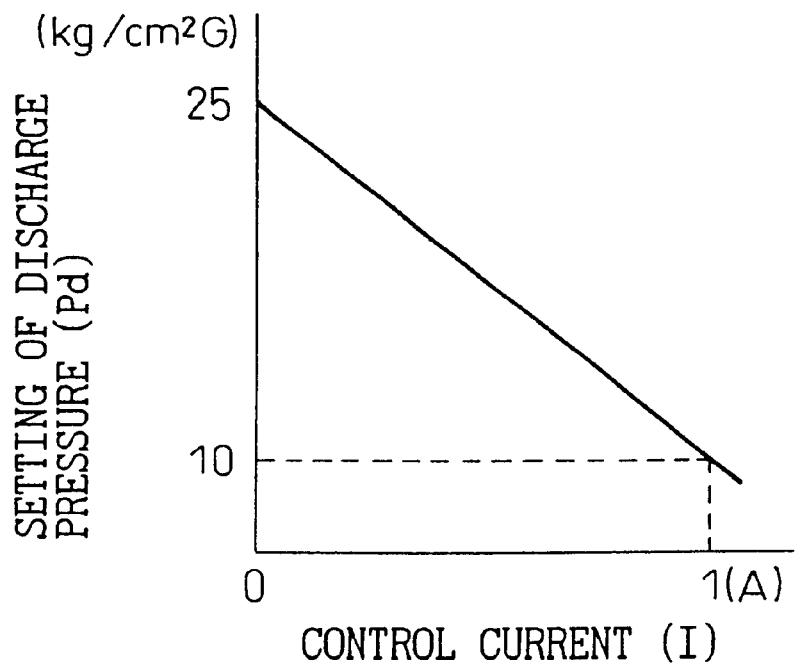

The electromagnetic type volume control valve 9 of the present embodiment is a variable volume control means for changing the setting of the discharge pressure (Pd) of the compressor 7 by the control current from the air-conditioner ECU 10 in the cooler mode and the heater mode as shown in FIG. 17A and thereby changing the discharge volume (Vc) of the compressor 7. Further, in the present embodiment, the electromagnetic type high pressure control valve 120 is provided instead of the hot gas volume control valve 99 of the fifth embodiment.

The high pressure control valve 120 is a variable discharge pressure means which has a valve element 122 for changing the opening degree of the communication port 121 formed in the valve body 119 and sets the discharge pressure (Pd) of the compressor 7 lower the closer the heater venting temperature (TH) detected by the later mentioned heater venting temperature sensor 110 becomes to the target heater venting temperature (THO: for example, 50° C.).

The stopping position of the valve element 122 is configured to be determined by the displacement position of the plunger 123 and the bellows 124. That is, the plunger 123 and the bellows 124 are linked with the valve element 122 through the intermediate member 125 and the rod 126. Further, the set position of the plunger 123 is configured to be changed by the magnitude of the control current to the electromagnetic coil 127.

Further, the valve body 119 is provided inside it with a return spring 128 for returning the plunger 123 to the initial position. Further, inside the bellows 124 is provided a return spring 129 for returning the bellows 124 to its initial position. Further, the end of the valve body 119 is provided with a cock 130 for setting the initial load of the return spring 129.

Further, the valve body 119 is formed with a pressure passage 131 giving a crank chamber pressure (Pc) to the crank chamber 52 of the compressor 7 and pressure passages 132 and 133 guiding the discharge pressure (Pd) of the compressor 7 through the communication passage 98b. Note that the pressure passage 131 and the pressure passage 132 are communicated through a communication port 121 in the valve body 119. Accordingly, the high pressure control valve 120 is structured to send the discharge pressure (Pd) of the compressor 7 to a crank chamber (control pressure chamber) 52. The change of the opening degree of the valve element 122 is determined by the expansion and contraction of the bellows 124 and the balance of the force of the plunger 123 in accordance with the control current to the electromagnetic coil 127.

On the other hand, the air-conditioner ECU 10 for controlling the various air-conditioning means in the air-conditioning unit 1, for example, the electromagnetic clutch 8, the electromagnetic type volume control valve 9, the blower fan motor 12, the drive motor 17, the switching control valve 98, the high-side pressure control valve 120, etc. receives as input switch signals from various switches such as a mode selection switch 100, a temperature control lever 111, an air-conditioner switch 102, and a blower fan switch 103. Of these, the temperature control lever 111 instructs the maximum cooling operation (MAX COOL) when operated to one extreme side and instructs the maximum heating operation (MAX HOT) when operated to the other extreme side.

Further, the air-conditioner ECU 10 receives as input sensor signals from various types of sensors such as an inside air temperature sensor 104, outside air temperature sensor 105, sunlight sensor 106, post-evaporator temperature sensor 107, cooling water temperature sensor 108, refrigerant pressure sensor 109, and heater venting temperature sensor 110. Of these, the heater venting temperature 110 corresponds to the venting temperature sensing means of the present invention and is a heater venting temperature detecting means for detecting the temperature of the air directly after passing through the heater core 5 (hereinafter referred to as a heater venting temperature).

Next, the control of the compressor capacity by the air-conditioner ECU 10 of the present embodiment will be simply explained based on FIG. 14 to FIG. 17.

The processing of step S10 of the flow chart of FIG. 5 of the first embodiment is performed, then for example the discharge volume (Vc) of the compressor 7 is controlled by for example feedback control (PI control). Specifically, the control current (I) of the compressor 7 serving as the target value for the control current to be supplied for the energization and deenergization of the electromagnetic coil 97 of the switching control valve 98 and for the electromagnetic coil 69 of the electromagnetic type volume control valve 9 and the electromagnetic coil 127 of the high pressure control valve 120 is calculated (determined) (control current processing means).

Specifically, the control current (In) is calculated based on the following equation (2) and equation (3):

$$En = TH - THO \quad (2)$$

$$In = In-1 - Kp\{(En - En-1) + (\theta/Ti) \times En\} \quad (3)$$

Note that TH is the actual heater venting temperature detected by the heater venting temperature sensor 110, THO is a preset target heater venting temperature (for example, 50° C.), Kp is a proportional constant, θ is a sampling period (for example, 1 second), Ti is an integration period, En is a current temperature error, En−1 is a previous temperature error, In is a current control current, and In−1 is a previous control current.

Here, when the driver turns on the ignition switch to start the engine and start the hot water type heating system 4, the cooling water passing through the cooling water circulation circuit 14 to cool the engine E flows into the heater core 5 in the air-conditioning duct 2. Further, when the temperature control lever 111 is set to the MAX HOT position, the outside air temperature (TAM) is a temperature lower than a predetermined temperature (for example, −5° C.), and the heater venting temperature (TH) is a temperature lower than the target heater venting temperature (THO), until a predetermined time (for example, 5 minutes to 15 minutes) passes from when the engine E starts (startup time), the cooling water temperature is low and the heating capacity of the heater core 5 is insufficient.

Therefore, the first solenoid valve 23 is closed, the second solenoid valve 24 is opened, the refrigeration cycle apparatus 20 is switched from the refrigeration cycle circuit 21 to the hot gas heater circuit 22, the electromagnetic clutch 8 is turned ON, and the compressor 7 is started so as to augment the heating capacity of the hot water type heating system 4. At this time, since the air-conditioning mode is the heater mode, the electromagnetic coil 97a of the switching control valve 98 is energized (ON) and the valve element 97 displaces downward in the figure so the communication passage 98a is closed. Due to this, the discharge pressure (Pd) of the compressor is guided to the pressure passages 132 and 133 through the communication passage 98b.

Figure 17B:
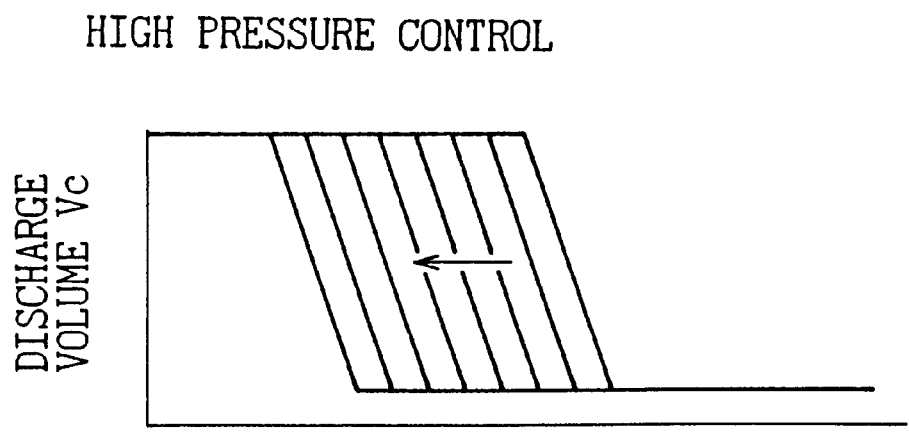
FIG. 17B is a graph of the relationship between the discharge pressure and discharge volume of the compressor according to the sixth embodiment of the present invention.

Further, when the discharge pressure (Pd) given to the pressure passage 133 is a low pressure of less than a first predetermined pressure (for example, a gauge pressure of 20 kg/cm²), as shown in FIG. 17B, the bellows 124 expands and the valve element 122 closes, whereby the crank chamber pressure (Pc) becomes equal to the suction pressure (Ps) and the discharge volume (Vc) of the compressor 7 becomes a large 100% volume.

Further, when the discharge pressure (Pd) given to the pressure passage 133 is a high pressure of more than a second predetermined pressure (for example, a gauge pressure of 22 kg/cm²), as shown in FIG. 17B, the bellows 124 contracts and the valve element 122 opens, whereby the crank chamber pressure (Pc) becomes equal to the discharge pressure (Pd) and the discharge volume (Vc) of the compressor 7 becomes a small 5% volume.

Further, when the suction pressure (Ps) given to the pressure passage 133 is higher than the first predetermined pressure and lower than the second predetermined pressure, as shown in FIG. 17B, the discharge volume (Vc) of the compressor 7 is continuously changed from 100% volume to 5% volume the higher the discharge pressure (Pd).

Here, by changing the control current to the electromagnetic coil 127 of the high pressure control valve 120 based on equations (2) and (3), the discharge pressure (Pd) of the compressor 7 is set lower as shown by the arrow mark of FIG. 17B the close the heater venting temperature (TH) detected by the heater venting temperature sensor 110 becomes to the target heater venting temperature (THO; for example 50° C.).

Due to this, even right after the engine E is started when the temperature of the cooling water, which had been low, rises, the heating load becomes smaller, and the discharge pressure (Pd) of the compressor 7 becomes lower, it is possible to make the discharge volume (Vc) of the compressor 7 further smaller. Due to this, when the heater venting temperature (TH) approaches the target heater venting temperature (THO), the rotational speed of the engine E belt driving the compressor 7 through the electromagnetic clutch 8 becomes the minimum necessary. Further, the flow rate of the refrigerant flowing inside the evaporator 6 also falls. At this time, the air flowing inside the air-conditioning duct 2 is partially heated when passing through the evaporator 6 and is fully heated when passing through the heater core 5, whereby the venting temperature of the air becomes the optimum venting temperature and it is possible to prevent the heating capacity of the evaporator 6 from becoming excessive.

In the sixth embodiment, as the venting temperature detecting means, use was made of the heater venting temperature sensor 110, but it is also possible to use the cooling water temperature sensor 108 as the venting temperature detecting means. That is, it is also possible to set the discharge pressure (Pd) of the compressor 7 lower the closer the cooling water temperature (TW) to the target cooling water temperature (TWO: for example, 80° C.).

Figure 18:
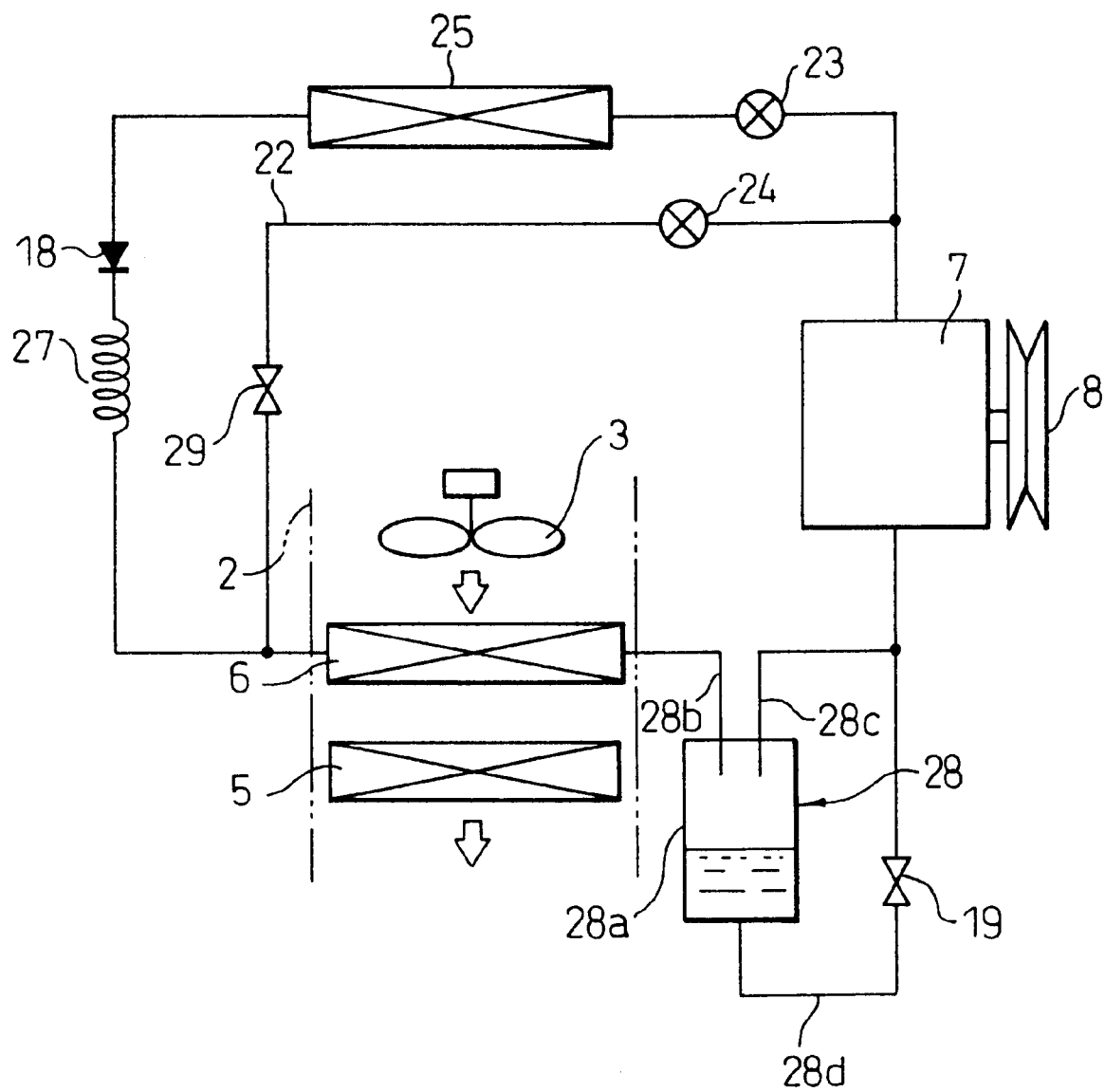
FIG. 18 is a view of a refrigeration cycle apparatus showing a seventh embodiment of the present invention.

FIG. 18 shows a seventh embodiment of the application of the present invention to a refrigeration cycle apparatus in a vehicular air-conditioning system. The compressor 7 is driven through an electromagnetic clutch 8 by the vehicle engine (not shown). At the discharge side of the compressor 7 is connected a condenser 25 through a first solenoid valve 23. At the outlet side of the condenser 25 is connected a first pressure reducing means 27 through a check valve 18. The first pressure reducing means 27 is comprised of a capillary tube (fixed calibrated orifice) in this embodiment.

The outlet side of the first pressure reducing means 27 is connected to an evaporator 6. The outlet side of the evaporator 6 is connected through an accumulator 28 to the suction side of the compressor 7. On the other hand, provision is made of a hot gas heater circuit 22 which directly connects the discharge side of the compressor 7 to the inlet side of the evaporator 6. The heater circuit 22 is provided with a second solenoid valve 24 and second pressure reducing means 29 in series. The second pressure reducing means 29 is comprised, in this embodiment, by a constant pressure valve which opens when the discharge pressure of the compressor 7 reaches over a predetermined value.

The evaporator 6 is provided in the air-conditioning duct 2 of the vehicular air-conditioning system 2. The air blown from the centrifugal blower fan 3 (passenger compartment inside air or outside air) is cooled in the summer cooler mode. In the winter heater mode, the evaporator 6 receives high temperature refrigerant gas (hot gas) flowing in from the hot gas heater circuit 22 and heats the air, so performs the function of a radiator. In the air-conditioning duct 2 at the downstream air side of the evaporator 6 is arranged a hot water type heater core 5 which heats the vented air using the hot water from the vehicle engine as a heat source. Air-conditioning air is vented from the vent (not shown) provided at the downstream side of the heater core 5 to the inside of the passenger compartment.

Next, explaining the portion of the accumulator 28, the key portion in the present invention, in more detail, at the top surface of the tank portion 28a of the accumulator 28 are provided an inlet passage 28 for introducing the refrigerant from the outlet of the evaporator 6 and a gas outlet passage 28 for guiding the gas phase refrigerant accumulated at the upper region of the inside of the tank. At the bottom of the tank portion 28a is provided a liquid outlet passage 28 for guiding the liquid phase refrigerant accumulated at the lower region of the inside of the tank.

The gas outlet passage 28c and the liquid outlet passage 28d merge and are connected to the suction side of the compressor 7. Further, the liquid outlet passage 28d is provided with a valve mechanism 19 able to change the opening degree (size of opening) of the calibrated orifice passage.

The valve mechanism 19 may specifically be comprised, as shown in FIG. 19, of a first control valve 19b which opens and closes a first calibrated orifice passage 19a with a small opening degree (diameter) and a second control valve 19d which opens and closes a second calibrated orifice passage 19c with a large opening degree (diameter). Here the diameter of the first calibrated orifice passage 19a is for example φ1.2 and the diameter of the second calibrated orifice passage 19c is for example φ2.5.

Figure 20:
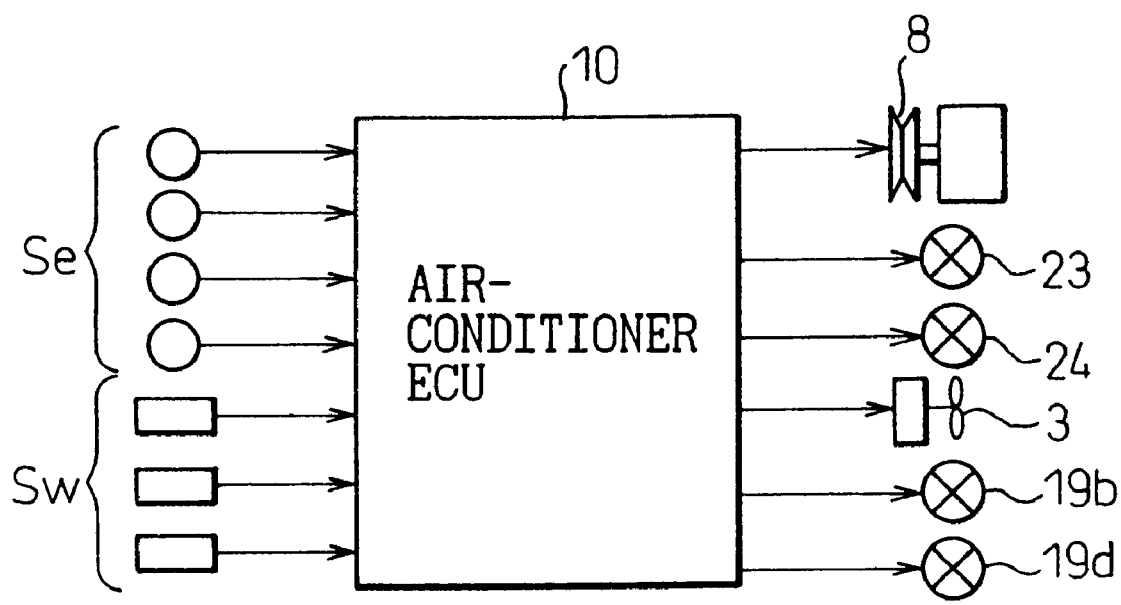
FIG. 20 is a block diagram of the electrical control in the seventh embodiment of the present invention.

The first and second control valves 19b and 19d may for example by comprised of solenoid valves. These first and second control valves 19b and 19d are opened and closed by energization under the control of the air-conditioner ECU 10 as shown in FIG. 20. In addition, the electromagnetic clutch 8, first and second solenoid valves 23 and 24, blower fan 3, and the like are also actuated under the control of the air-conditioner ECU 10. The air-conditioner ECU 10 receives as input signals from a group of various sensors Se for control of the air-conditioning and operating switches Sw of the air-conditioner operation panel as is well known.

Next, an explanation will be made of the operation of the seventh embodiment of the present invention. In the summer cooler mode, the first solenoid valve 23 is opened and the second solenoid valve 24 is closed by the air-conditioner ECU 10. At the same time, the first and second control valves 19b and 19d are placed in the states shown in FIG. 19(a), that is, the first control valve 19b is opened and the second control valve 19d is closed.

Accordingly, the electromagnetic clutch 8 is engaged and the compressor 7 is driven by the vehicle engine, whereby the discharge gas phase refrigerant of the compressor 7 passes through the open first solenoid valve 23 and flows into the condenser 25. In the condenser 25, the refrigerant is cooled and condensed by the outside air blown from the cooling blower fan 16. Further, the condensed liquid phase refrigerant passes through the check valve 18 and is reduced in pressure by the first pressure reducing means 27 to become a low temperature, low pressure two-phase liquid and gaseous state.

Next, the low pressure refrigerant flows into the evaporator 6, absorbs heat from the air-conditioning air blown by the blower fan 3, and evaporates. The air-conditioning air cooled by the evaporator 6 is vented into the vehicle passenger compartment to cool the passenger compartment. The refrigerant passing through the evaporator 6 flows from the inlet passage 28b of the accumulator 28 to the inside of the tank portion 28a. In the tank portion 28a, the gas phase refrigerant and the liquid phase refrigerant are separated by the difference in their specific gravities. The gas phase refrigerant accumulates in the upper region of the tank portion 28a. The gas phase refrigerant passes through the gas outlet passage 28c and is sucked into the compressor 7.

Further, in the liquid outlet passage 28d of the accumulator 28, since the first control valve 19b is closed, the liquid phase refrigerant accumulated at the lower part of the tank portion 28a (including lubrication oil) passes through the small diameter first calibrated orifice portion 19a and is sucked into the compressor 7. Here, the diameter of the first calibrated orifice passage 19a is set to the minimum value (for example, φ1.2) required for securing an amount of return oil required for lubrication of the compressor 7, whereby the increase in the amount of oil recirculated to the cycle can be suppressed and the cooling capacity improved. Due to the suppression of the amount of liquid phase refrigerant sucked into the compressor 7, the energy consumption of the compressor can also be reduced.

In the winter heater mode, the first solenoid valve 23 is closed, the second solenoid valve 24 is opened, and the hot gas heater circuit 22 is opened up by the air-conditioner ECU 10. At the same time, the first and second control valves 19b and 19d enter the states shown in FIG. 19B, that is, the first control valve 19b is closed and the second control valve 19d is opened. These open and closed states of the valves may be switched between by judgement by the air-conditioner ECU 10 of the conditions where the maximum heating state is required and the temperature of the hot water flowing into the heater core 5 falls below a predetermined value.

Further, as explained above, if the open and closed states of the valves are changed, the high temperature discharge gas refrigerant (superheated gas phase refrigerant) of the compressor 7 passes through the open state second solenoid valve 24 and is reduced in pressure by the second pressure reducing means 29, then the reduced pressure superheated gas phase refrigerant releases its heat by the venting air of the evaporator 6 and heats the vented air. Further, the gas phase refrigerant releasing heat in the evaporator 6 flows from the inlet passage 28b of the accumulator 28 into the tank portion 28a, passes through the gas outlet passage 28c, and is sucked into the compressor 7.

The amount of heat discharged from the gas phase refrigerant at the evaporator 6, however, corresponds to the amount of compression work of the compressor 7, so to increase the amount of heat released at the evaporator 6, it is necessary to increase the amount of compression work of the compressor 7.

Therefore, in the heater mode, in the accumulator 28, the second control valve 19d is opened and the liquid phase refrigerant (including lubrication oil) passing through the large diameter second calibrated orifice portion 28a is sucked into the compressor 7. Due to this, compared with the cooler mode, in the heater mode, the amount of liquid phase refrigerant sucked from the accumulator 28 into the compressor 7 increases. The amount of compression work can therefore be increased and the heating capacity improved.

Note that as the second pressure reducing means 29, in the present embodiment, use is made of a constant pressure valve which opens when the discharge pressure of the compressor 7 rises above a predetermined value. Further, the check valve 18 prevents the gas phase refrigerant from the hot gas heater circuit 22 from flowing back into the condenser 25 and the refrigerant accumulating in condenser 25 during the heater mode.

Figure 21:
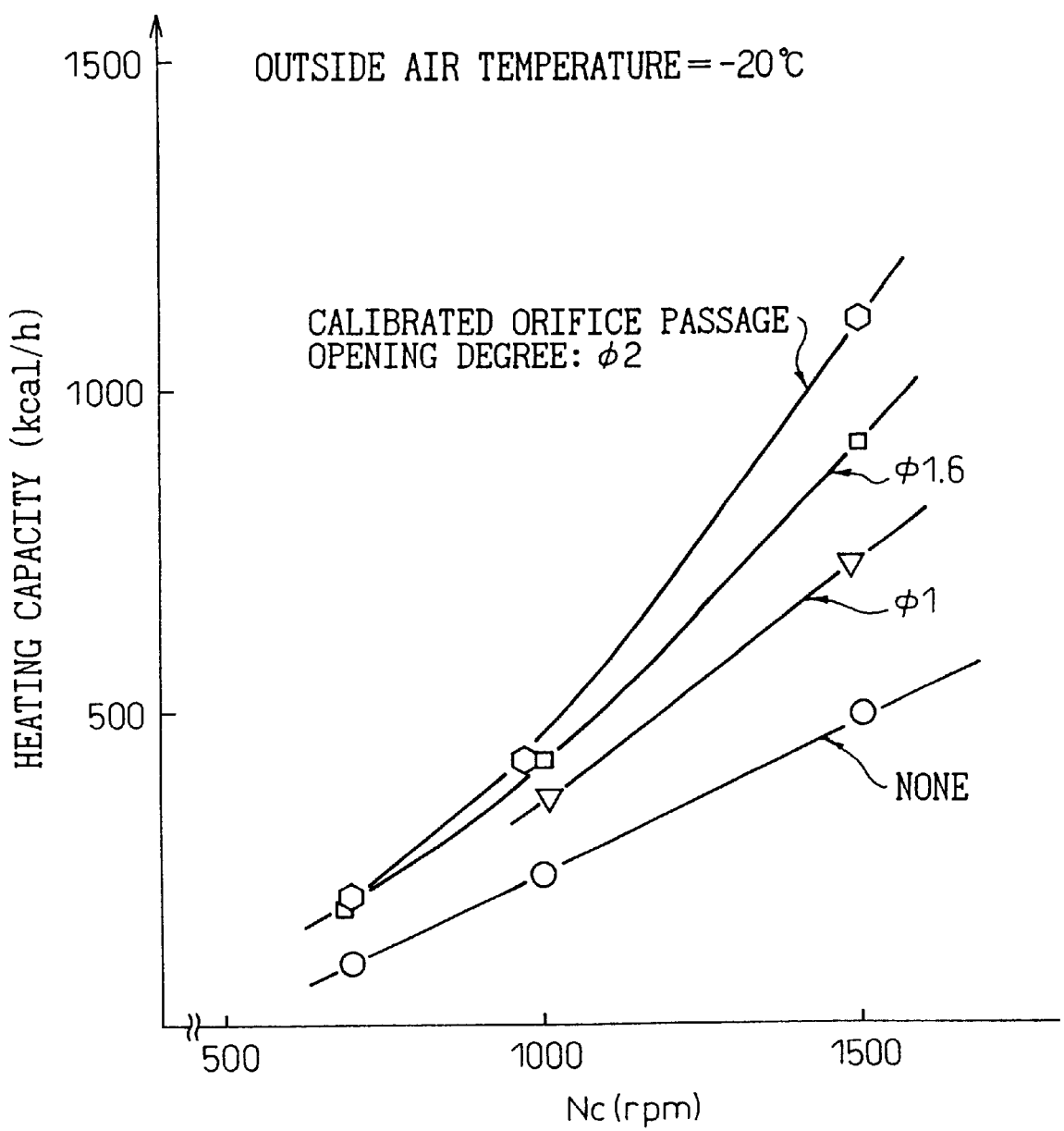
FIG. 21 is a graph of the effect of the seventh embodiment.

FIG. 21 is a graph showing the rotational speed Nc of the compressor along the ordinate and the heating capacity along the abscissa and shows the results of experiments conducted by the present inventors. As will be understood from the graph of FIG. 21, the heating capacity can be increased along with an increase of the diameter of the calibrated orifice passage of the liquid outlet passage 28d of the accumulator 28.

Figure 22:
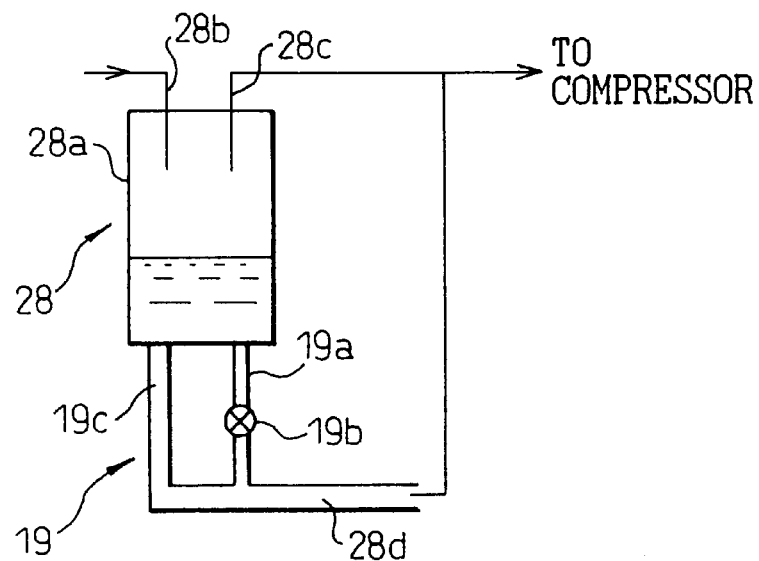
FIG. 22 is an explanatory view of the valve mechanism in an eighth embodiment of the present invention.

FIG. 22 shows an eighth embodiment where two calibrated orifice passages 19a and 19c with identical opening degrees (identical diameters) are provided in parallel in the valve mechanism 19, a control valve 19b is provided at only one calibrated orifice passage 19a, the control valve 19b is closed in the cooler mode, and the control valve 19b is opened in the heater mode. Due to this, in the cooler mode, the liquid phase refrigerant passes through just the one calibrated orifice passage 19c to be sucked into the compressor 7, while in the heater mode, the liquid phase refrigerant passes through the parallel circuit of the two calibrated orifice passages 19a and 19c and is sucked into the compressor 7, so the amount of liquid phase refrigerant sucked into the compressor 7 in the heater mode can be increased. The rest of the embodiment is the same as the seventh embodiment.

Figure 23:
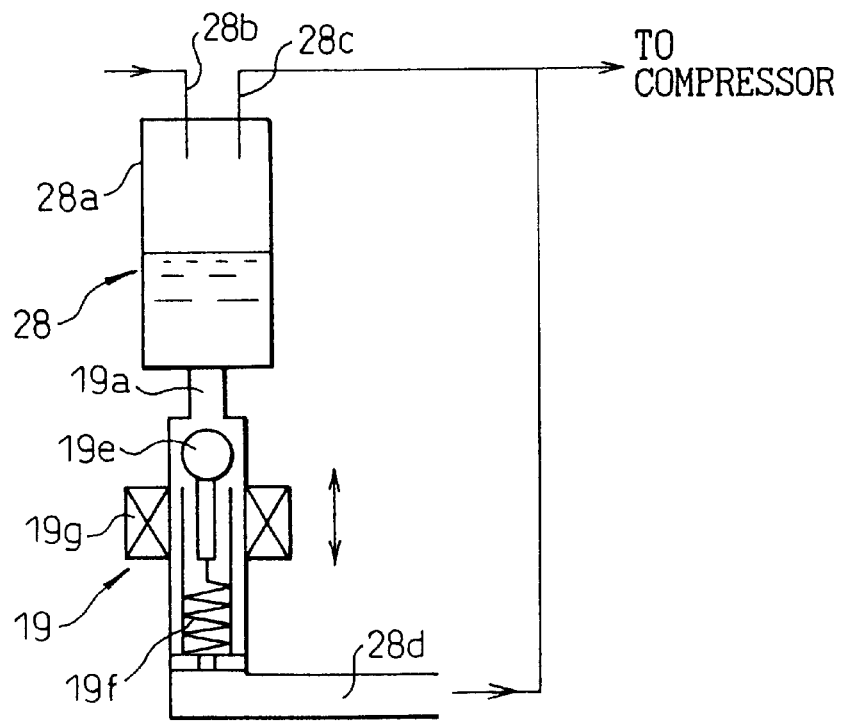
FIG. 23 is an explanatory view of the valve mechanism in a ninth embodiment of the present invention.

FIG. 23 shows a ninth embodiment in which as the valve mechanism 19, use is made of a solenoid valve mechanism which can continuously control the opening degree of the calibrated orifice passage 19a of the liquid outlet passage 28d. The valve mechanism 19 is provided with a ball-shaped valve element 19e for adjusting the opening degree of the calibrated orifice passage 19a, a spring 19f giving a spring force to the valve element 19e in the closing direction, and an electromagnetic coil 19g giving an electromagnetic attraction force to the valve element 19e. By continuously changing the current to the electromagnetic coil 19g, it is possible to continuously adjust the opening degree of the calibrated orifice passage 19a.

Figure 24:
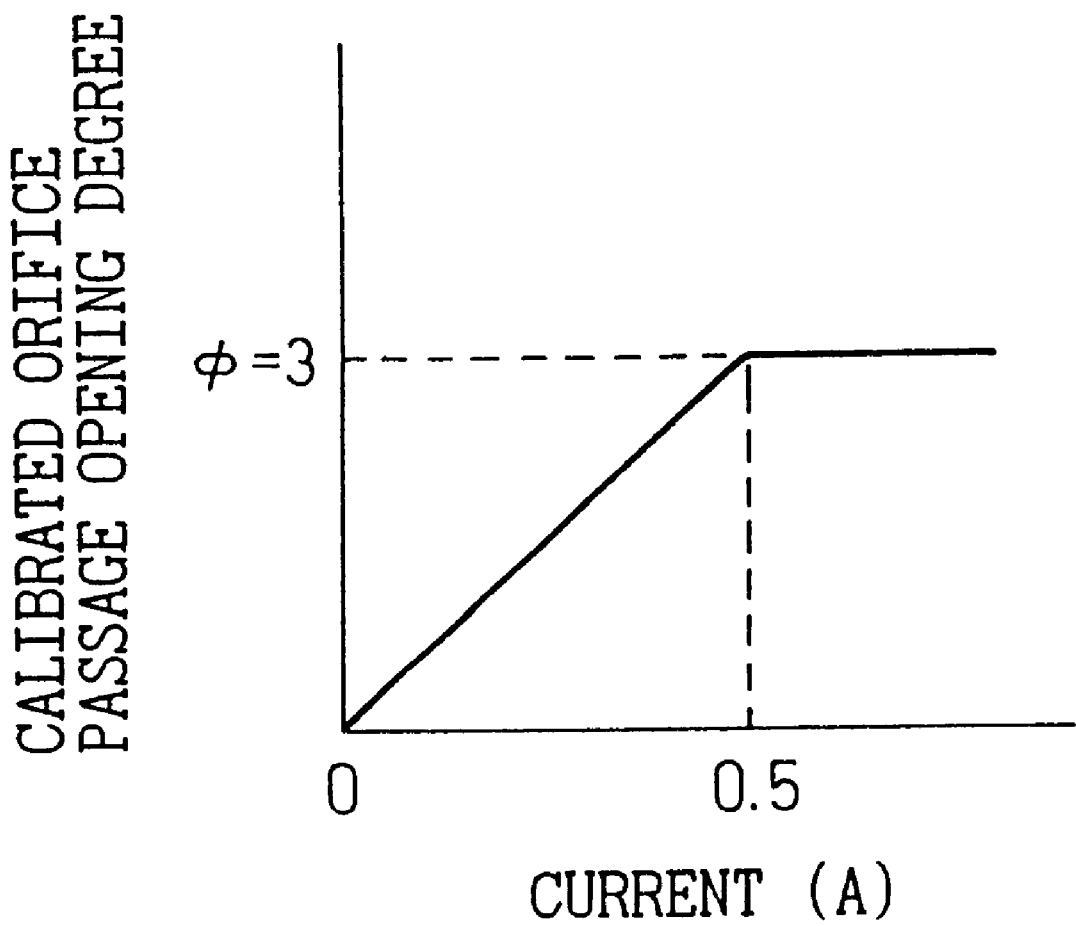
FIG. 24 is a view of the operating characteristic of the valve mechanism in the ninth embodiment of the present invention.

FIG. 24 is a graph illustrating the relationship between the current to the electromagnetic coil 19g due to the valve mechanism 19 and the opening degree of the calibrated orifice passage 19a. By taking note of the operating characteristic shown in FIG. 24 and the operating characteristic shown in FIG. 21 and controlling the current to the electromagnetic coil 19g in accordance with the operating conditions in the heater mode by the air-conditioner ECU 10 (FIG. 20), it is possible to change the opening degree of the calibrated orifice passage 19a in accordance with the heating capacity required at the time of the heater mode.

Explaining this more in more detail, by detecting the outside air temperature by the group of sensors Se and increasing the current to the electromagnetic coil 19g as the outside air temperature falls, it is possible to increase the heating capacity in accordance with a fall in the outside air temperature.

Further, by detecting the passenger compartment temperature (inside air temperature) instead of the outside air temperature by the group of sensors Se and increasing the current to the electromagnetic coil 19g in accordance with a fall in the inside air temperature, it is possible to increase the heating capacity in accordance with a fall in the inside air temperature.

Further, by calculating the necessary temperature of the air vented (TAO) into the passenger compartment based on the outside air temperature, inside air temperature, and temperature setting of the driver or passengers by the air-conditioner ECU 10 and increasing the current to the electromagnetic coil 19g as the required temperature of the vented air (TAO) rises in the heater mode, it is possible to increase the heating capacity in accordance with a rise in the required temperature of the vented air (TAO).

Further, since there is a correlation between the discharge side pressure of the compressor 7, that is, the high-side pressure, and the temperature of the gas phase refrigerant flowing into the evaporator 6, by increasing the current to the electromagnetic coil 19g as the high-side pressure falls, it is possible to prevent in advance the fall in the heating capacity caused by the fall in the high-side pressure.

Figure 25:
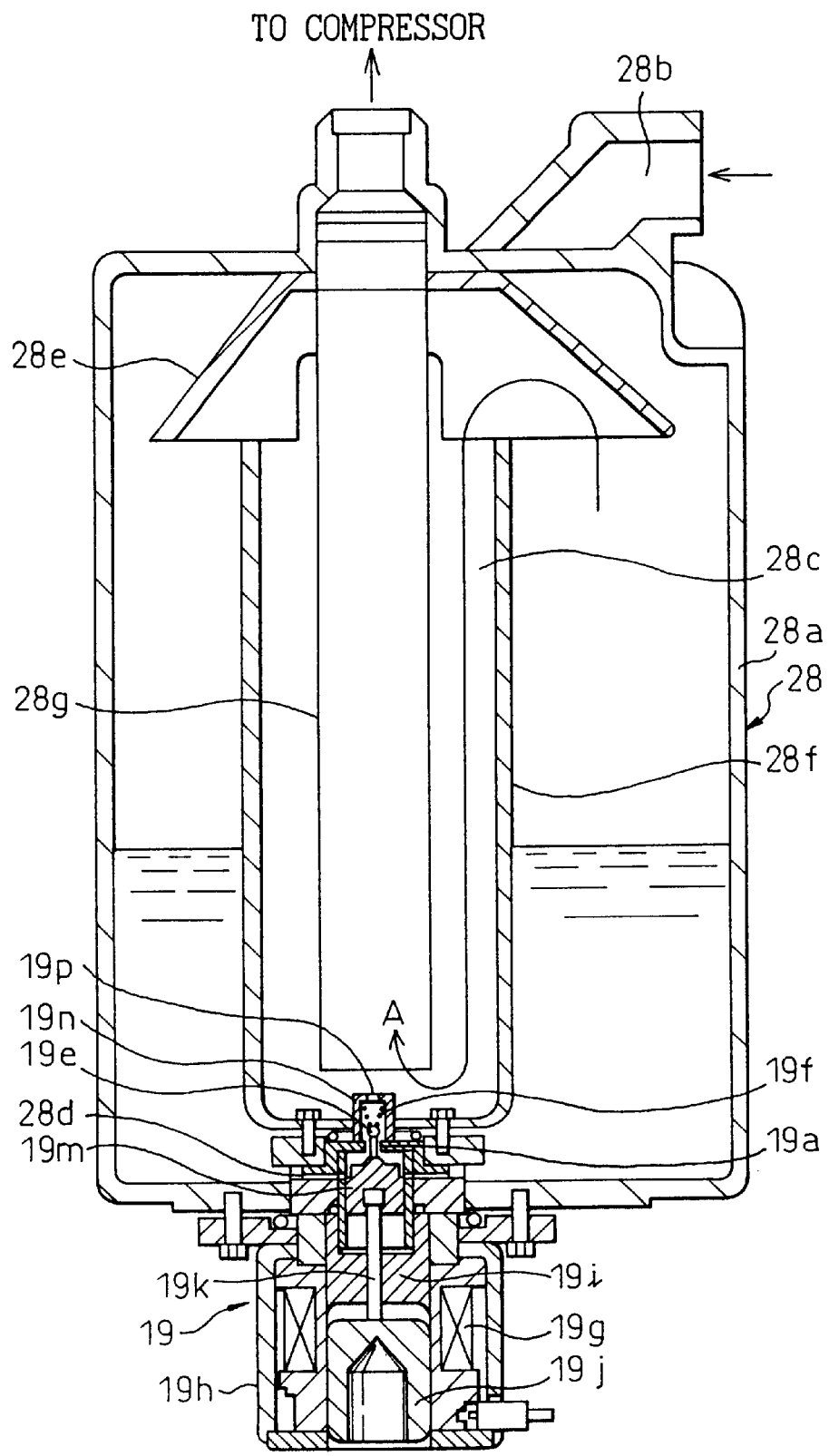
FIG. 25 is a longitudinal sectional view of an accumulator showing a 10th embodiment of the present invention.

FIG. 25 shows a 10th embodiment where the valve mechanism 19 of the ninth embodiment is made integral with the accumulator 28. In FIG. 25, an inlet passage 28b is formed at the top surface of the cylindrical tank portion 28a of the accumulator 28. The inlet passage 28b is communicated with the inside of the tank through a hole (not shown) formed in the top surface of the tank portion 28a. Since an umbrella shaped guide member 28e is affixed to the inside wall of the top surface of the tank portion 28a, the refrigerant from the inlet passage 28b flows into the tank along the outer surface of the guide member 28e.

On the other hand, an electromagnetic drive portion 19h of the valve mechanism 19 is arranged at the outside of the bottom of the tank portion 28a. This electromagnetic drive portion 19h is provided with a fixed magnetic pole member 19i and a movable magnetic pole member (plunger) 19j which moves along the fixed magnetic pole member 19i due to the electromagnetic attraction force of the electromagnetic coil 19g. This movable magnetic pole member 19j is connected through a shaft 19k and piston-shaped linkage 19m to the spherical valve element 19e. Therefore, the movable magnetic pole member 19j and the ball-shaped valve element 19e displace integrally in the vertical direction of FIG. 25.

At the inside of the bottom of the tank portion 28a is formed a liquid outlet passage 28d for carrying the liquid refrigerant. A calibrated orifice passage 19a is formed in the middle of the liquid outlet passage 28d. The opening degree of the calibrated orifice passage 19a is made to be able to be continuously changed by the ball-shaped valve element 19e. The outlet side of the calibrated orifice passage 19a is communicated with the inside of the bottom of the cylindrical member 28f through a communication hole 19p of a holding case 19n of a spring 19f giving a spring force to the valve element 19d force in a direction closing the valve.

The cylindrical member 28f is arranged so that the center portion of the inside of the tank portion 28a extends in the vertical direction. At the center of the inside of the cylindrical member 28f is concentrically arranged a refrigerant outlet pipe 28g. In this way, the gas phase refrigerant accumulated in the upper region of the tank portion 28g passes from the opening at the lower end of the refrigerant outlet pipe 28g into the pipe 28g and flows out to the outside of the accumulator 28.

Further, the liquid phase refrigerant accumulated at the lower region of the tank portion 28a passes through the liquid outlet passage 28d, the calibrated orifice passage 19a, the communication hole 19p, etc. to flow into the inside of the bottom of the cylindrical member 28f, where it is mixed with the gas phase refrigerant and is sucked into the refrigerant outlet pipe 28g. Accordingly, in this embodiment, the gas outlet passage 28c is comprised of the inside space of the cylindrical member 28f.

In the 10th embodiment as well, however, since the amount of displacement of the ball-shaped valve element 19e can be continuously adjusted by the control of the current to the electromagnetic coil 19g, in the same way as in the ninth embodiment, it is possible to control the opening degree of the calibrated orifice passage 19a to the optimal value in accordance with the operating conditions in the heater mode.

Figure 26:
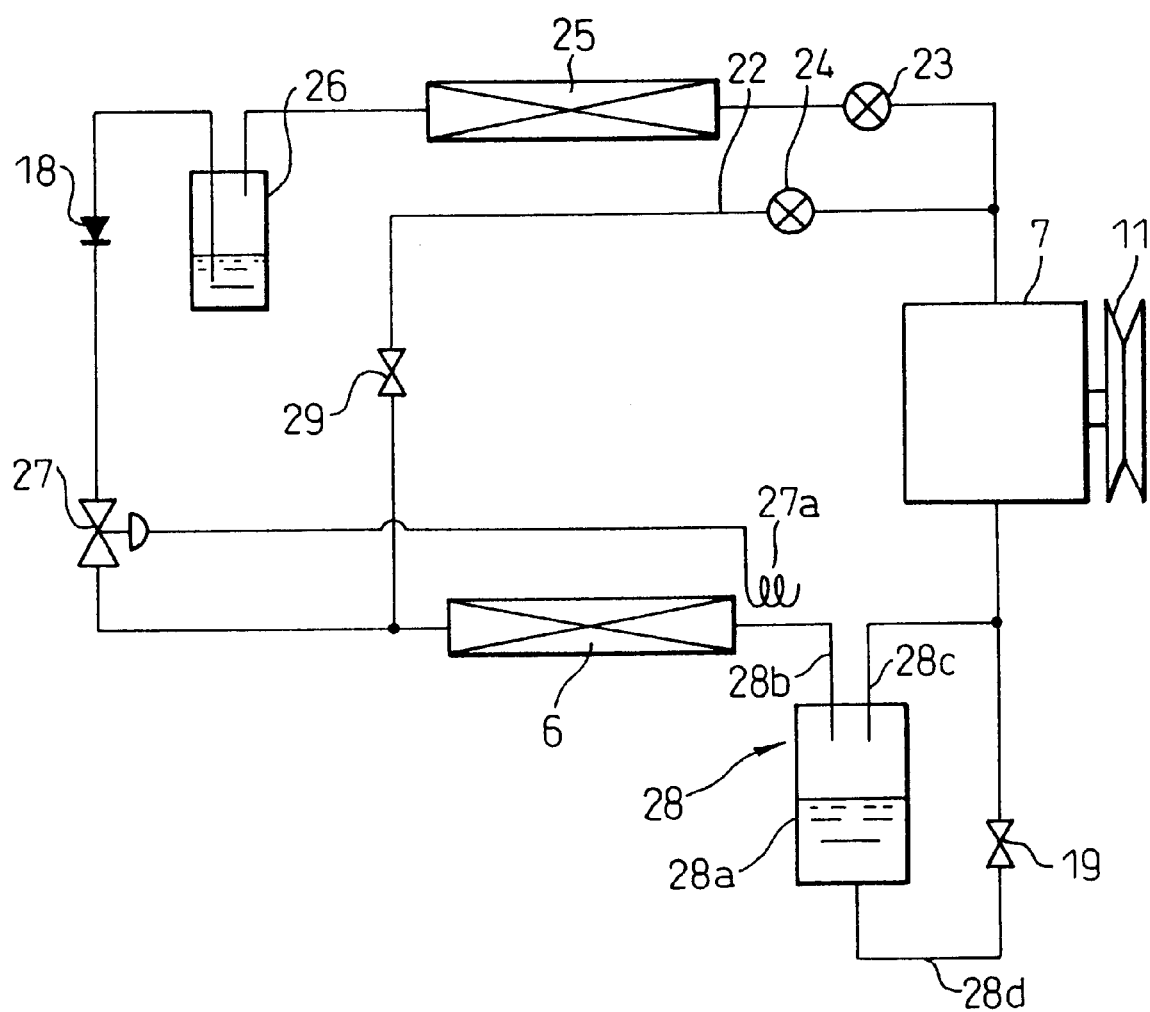
FIG. 26 is a view of a refrigeration cycle apparatus showing an 11th embodiment of the present invention.

FIG. 26 shows an 11th embodiment in which a receiver 26 is arranged between the condenser 25 and check valve 18. In the receiver 26, the liquid and gas phases of the refrigerant condensed at the condenser 25 are separated. The liquid phase refrigerant is accumulated, while the gas phase refrigerant is guided to the check valve 18 side. The present invention can be similarly applied to a refrigeration cycle apparatus having such a receiver 26.

As the first pressure reducing means 27, in this embodiment, use is made of a temperature type expansion valve which adjusts the opening degree (refrigerant flow rate) so that the superheating of the refrigerant at the outlet of the evaporator 6 is maintained at a predetermined value. Reference numeral 27a is a temperature sensing member for sensing the temperature of the refrigerant at the outlet of the evaporator 6.

Figure 27:
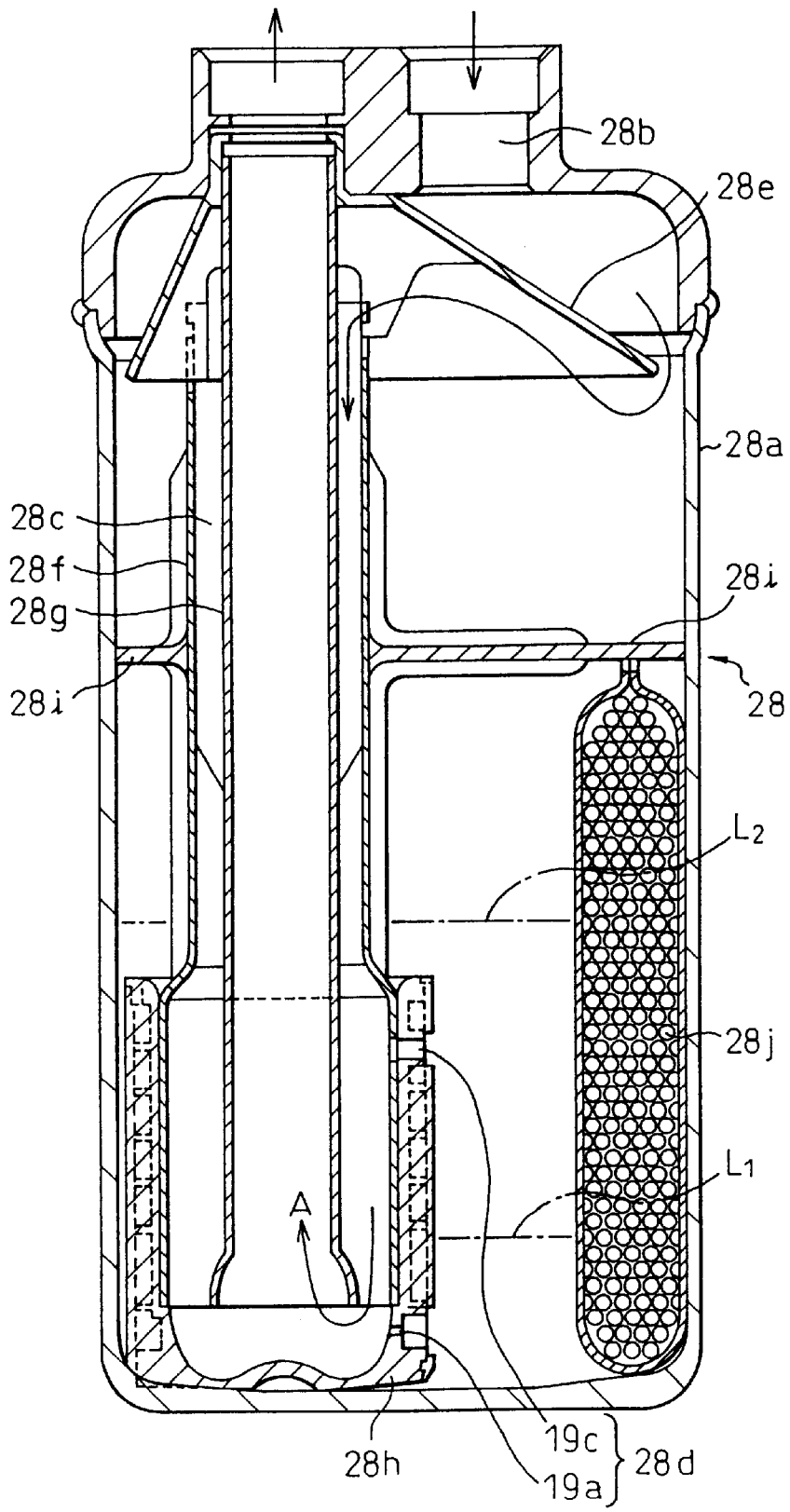
FIG. 27 is a longitudinal sectional view of an accumulator showing a 12th embodiment of the present invention.

FIG. 27 shows a 12th embodiment. In the 12th embodiment, note is taken of the fact that in a refrigeration cycle apparatus having the receiver 26 of FIG. 26, the surface of the liquid phase refrigerant in the accumulator 28 changes by a large degree between the cooler mode and the heater mode and the opening degrees of the calibrated orifice passages 19a and 19c of the liquid outlet passage 28d of the accumulator 28 are switched accordingly.

That is, in a refrigeration cycle apparatus having the receiver 26, since, as the first pressure reducing means 27, use is made of a temperature type expansion valve which adjusts the valve opening degree (refrigerant flow rate) so that the superheating of the refrigerant at the outlet of the evaporator 6 is maintained at a predetermined value, during the cooler mode, the refrigerant at the outlet of the evaporator 6 is maintained in the superheated gas state having superheating at all times by the temperature type expansion valve 27. Therefore, only the lubrication oil in the cycle is accumulated in the accumulator 28.

As opposed to this, in the heater mode, the superheating of the refrigerant at the outlet of the evaporator is not controlled by the temperature type expansion valve 27, the high temperature refrigerant gas (hot gas) from the hot gas heater circuit 22 flows directly into the evaporator 6, and part of the high temperature refrigerant gas condenses at the evaporator 6, so both the liquid refrigerant and the lubrication oil accumulate in the accumulator 28.

As a result, the height of the liquid level in the accumulator 28 becomes higher in the heater mode and becomes lower in the cooler mode.

Therefore, in the 12th embodiment, the small opening cooling use first calibrated orifice passage 19a is arranged at the downward side in the vertical direction of the accumulator 28 (near bottom of accumulator 28) and the large opening heating use second calibrated orifice passage is arranged at the upward side in the vertical direction of the accumulator 28.

FIG. 27 illustrates the specific structure of the accumulator 28 according to the 12th embodiment. Parts the same as or equivalent to those in the accumulator 28 of FIG. 25 are given the same reference numerals and explanations thereof are omitted.

In the accumulator 28 of the 12th embodiment as well, provision is made of a cylindrical member 28f which extends in the vertical direction in the center of the inside of the tank portion 28a and a refrigerant outlet pipe 28g arranged concentrically with the center of the inside of the cylindrical member 28f. By this, the gas phase refrigerant accumulated at the top region in the tank portion 28a passes through the inside space of the cylindrical member 28f as shown by the arrow A, that is, through the gas outlet passage 28c, then passes from the lower opening of the refrigerant outlet pipe 28g through the pipe 28g and flows to the outside of the accumulator 28.

On the other hand, at the lower end of the cylindrical member 28f is connected a cylindrical cap member 28h with a bottom portion so as to close the opening of the bottom portion of the cylindrical member 28f. At a position near the bottom portion of the cap member 28h (for example, a position about 10 mm higher than the bottom surface of the tank portion 28a) is provided the above small opening cooling use first calibrated orifice passage 19a. The diameter of the first calibrated orifice passage 19a is for example ϕ1.0.

On the other hand, the large opening heating use second calibrated orifice passage 19c is provided passing through the engaging portion of the cylindrical member 28f and the cap member 28h exactly a predetermined dimension (for example, about 20 to 30 mm) above the first calibrated orifice passage 19a. The diameter of the second calibrated orifice passage 19c is for example ϕ2.3.

Note that in FIG. 27, reference numeral 28i shows a support stay which is arranged between the outer circumference of the cylindrical member 28f and the inner wall of the tank portion 28a and stably supports the cylindrical member 28f. A plurality of (four) support stays 28i are arranged to extend in a radial manner from the outer circumference of the cylindrical member 28f. Reference numeral 28j is a desiccant for absorbing the moisture in the cycle.

According to the 12th embodiment, in the cooler mode, just the lubrication oil in the cycle is accumulated in the accumulator 28 due to the control of the superheating of the outlet refrigerant of the evaporator by the temperature type expansion valve 27 of FIG. 26, so the liquid level in the accumulator 28 falls below the second calibrated orifice passage 19c. $L_1$ of FIG. 27 shows the liquid level in the cooler mode.

Therefore, in the cooler mode, the lubrication oil passing through only the first calibrated orifice passage 19a positioned below the liquid level $L_1$ and near the bottom of the accumulator 28 is sucked into the cylindrical member 28f and returned to the suction side of the compressor 7.

As opposed to this, in the heater mode, both the liquid phase refrigerant and the lubrication oil accumulate in the accumulator 28 as mentioned above. The height of the liquid level in the accumulator becomes sufficiently high compared with the cooler mode and rises to above the second calibrated orifice passage 19c. $L_2$ of FIG. 27 shows the liquid level in the heater mode.

Therefore, in the heater mode, the liquid phase refrigerant and the lubrication oil in the accumulator 28 pass through both of the first calibrated orifice passage 19a and the second calibrated orifice passage 19c and are sucked to the inside of the cylindrical member 28 and returned to the suction side of the compressor 7. Therefore, it is possible to increase the amount of liquid phase refrigerant and lubrication oil sucked into the compressor 7 and improve the heating capacity.

Further, according to the 12th embodiment, since use is made of the fact that the level of the liquid phase refrigerant in the accumulator 28 changes by a large amount between the cooler mode and the heater mode and the opening degrees of the calibrated orifice passages 19a and 19c in the cooler mode and heater mode are switched, it is possible to eliminate the valve mechanism for changing the opening degrees and thereby simplify the configuration. Further, since the first and second calibrated orifice passages 19a and 19c are housed in the accumulator 28 and there is no need to provide any additional mechanisms at the outside of the accumulator, the accumulator 28 can be made smaller in shape.

Note that in the above embodiment, provision was made of a second pressure reducing means 29 in the hot gas heater circuit 22 for the heater mode and the second pressure reducing means 29 was used to reduce the pressure of the gas phase refrigerant discharged from the compressor and make the refrigerant flow into the evaporator 6, the second pressure reducing means 29 of the hot gas heater circuit 22 may be abolished and the outlet portion of the hot gas heater circuit 22 may be connected to the upstream portion of the first pressure reducing means 27 and the gas phase refrigerant passing through the hot gas heater circuit 22 reduced in pressure by the first pressure reducing means 27 and then made to flow into the evaporator 6.

Further, while use was made of the first and second solenoid valves 23 and 24 as the switching means for switching the gas discharged from the compressor between the condenser 25 side passage and the hot gas heater circuit 22 side, it is of course also possible to replace these by a single three-way switching valve.

Further, in the 12th embodiment, the opening degree of the first calibrated orifice passage was made small and the opening degree of the second calibrated orifice passage 19c was made large, but since the liquid phase refrigerant and lubrication oil flow in from both of the first and second calibrated orifice passages 19a and 19c, the opening degrees of the first and second calibrated orifice passages may also be made the same.

To augment the heating capacity of the heater core 5, further, when switching the refrigeration cycle apparatus 20 to the hot gas heater circuit 22, the control current to the electromagnetic coil 69 is set to 0A and the setting of the suction pressure (Ps) is made for example −1 kg/cm²G for use of the electromagnetic volume control valve 9.

Figure 28:
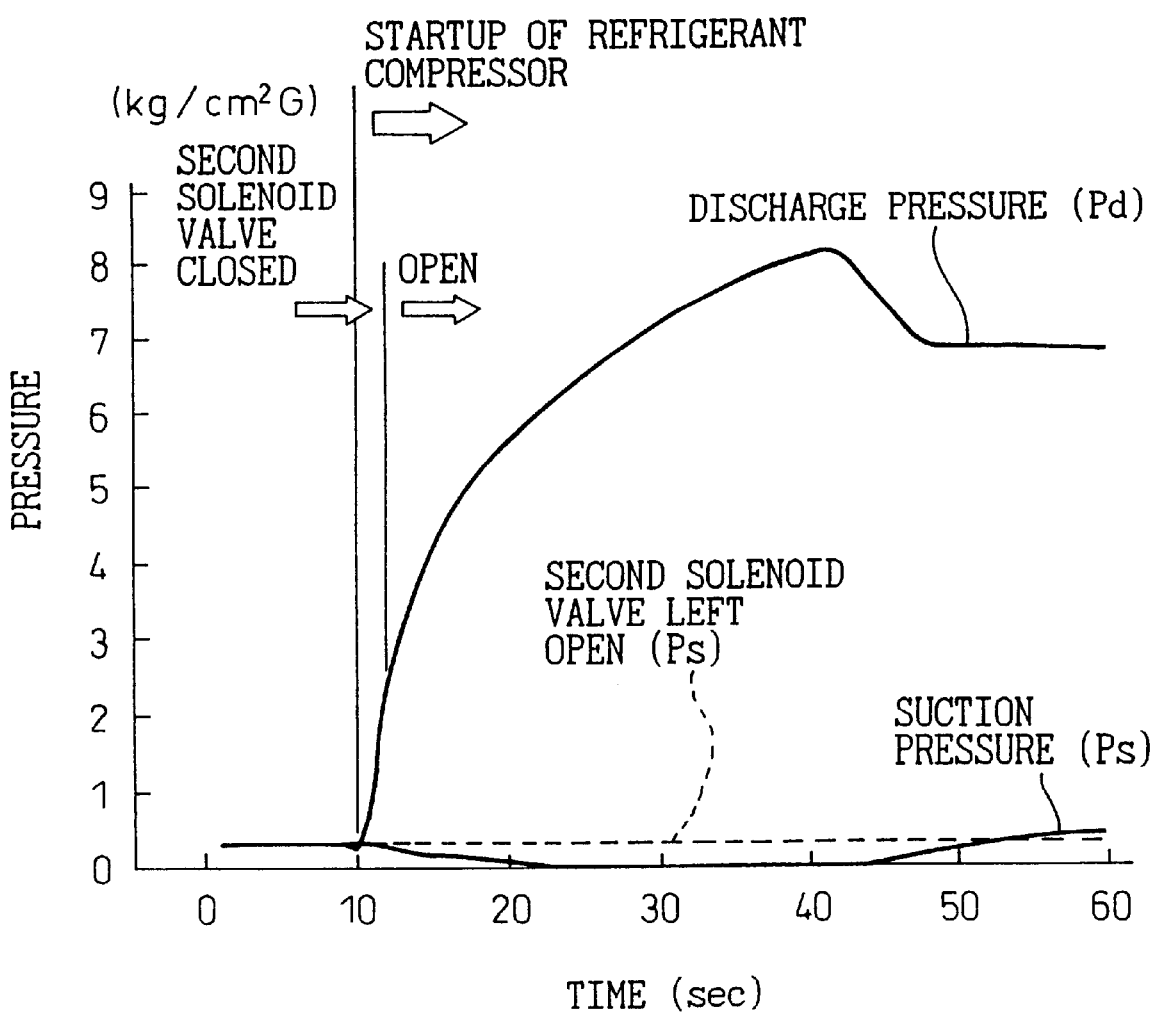
FIG. 28 is a time chart showing the suction pressure and discharge pressure of a refrigerant compressor according to a 13th embodiment of the present invention.

Further, even if the control pressure (Pc) is controlled to fall the most in this way, when the temperature of the outside air where the hot gas heater circuit 22 is to be used is in the extremely cold region of less than −10° C., for example, as shown by the broken line in the time chart of FIG. 28, the saturation pressure of the refrigerant becomes less than 1 kg/cm²G and the pressure difference (between the high-side pressure and the low-side pressure of the refrigeration cycle apparatus 20, which is a factor increasing the discharge volume discharged from the discharge port of the compressor 7, cannot be obtained, so the discharge volume will never become large.

Therefore, in the case of a vehicular use air-conditioning system which is controlled to turn the blower fan motor 12 off until the cooling water temperature (TW) of the engine E rises above a predetermined temperature (for example, 40° C.) at the startup time of the heater mode to prevent cold air from being vented into the passenger compartment, when mounting an engine with a small exhaust heat, the cooling water temperature (TW) will not rise above the predetermined temperature (for example, 40° C.) TWa in an extremely cold region where the temperature of the outside air (TAM) is less than −30° C., so the centrifugal blower fan 13 will end up not operating and the passenger compartment will not be able to be heated ever.

Therefore, in a 13th embodiment of the present invention, at the time of startup of the auxiliary heating operation motor for augmenting the heating capacity of the heater core 5 of the hot water type heating system, that is, at the time of startup of the compressor 7 at the time of operation of the refrigeration cycle apparatus 20 in the hot gas heater circuit 22, the first and second solenoid valves 23 and 24 are both closed and the high-side pressure of the refrigeration cycle apparatus 20, that is, the discharge pressure (Pd) of the discharge port of the compressor 7, is made easier to rise above 2 kg/cm² G so as thereby to increase the discharge volume of the compressor 7. Next, the second solenoid valve 24 is opened to constitute the hot gas heater circuit 22. The changes in the discharge pressure (Pd) and the suction pressure (Ps) of the compressor 7 are shown by the solid lines in the time chart of FIG. 28.

Accordingly, with the second solenoid valve 24 left open, there is no difference between the discharge pressure (Pd) and the suction pressure (Ps) and the discharge volume remains at a minimum. When the compressor 7 is started up, however, the second solenoid valve 25 is closed until predetermined conditions are satisfied, whereby the discharge pressure (Pd) suddenly rises and therefore the discharge volume of the compressor 7 becomes larger, it was learned.

Therefore, at the time of startup of the auxiliary heating operation motor for augmenting the heating capacity of the heater core 5 of the hot water type heating system, that is, at the time of startup of the compressor 7 at the time of operation of the refrigeration cycle apparatus 20 in the hot gas heater circuit 22, the conditions for closing the second solenoid valve 24 (predetermined conditions) are for example that the high-side pressure (discharge pressure) of the refrigeration cycle apparatus 20 detected by a refrigerant pressure sensor 109 be less than 2 kg/cm²G, the suction temperature of the air sucked into the evaporator 6 (evaporation suction temperature) be less than 0° C., etc. Note that an evaporator suction temperature of less than 0° C. means that when the suction port mode is the inside air circulation mode, the inside air temperature (TR) detected by an inside air temperature sensor 104 is less than 0° C. and that when the suction port mode is the outside air introduction mode, the outside air temperature (TAM) detected by an outside air temperature sensor 105 is less than 0° C.

Further, the conditions for opening the second solenoid valve 24 after the startup of the auxiliary heating operation mode, that is, after the startup of the compressor 7 in the case of operating the refrigeration cycle apparatus 20 by the hot gas heater circuit 22, are for example that the high-side pressure of the refrigeration cycle apparatus 20 rise to more than 2 kg/cm²G, about 10 seconds pass after startup of the compressor 7, etc.

As explained above, at the time of startup of the auxiliary heating operation mode, even if the outside air temperature (TAM) is less than 0° C. (in particular less than −20° C.), the air-conditioning unit 1 of the 13th embodiment closes the second solenoid valve 24 after the startup of the compressor 7 until predetermined conditions are satisfied, whereby it is possible to raise the discharge pressure (Pd) of the compressor 7 and therefore increase the difference between the pressure levels of the refrigeration cycle apparatus 20.

Due to this, even if an external variable volume compressor is incorporated in the refrigeration cycle apparatus 20, it is possible to increase the discharge volume of the compressor 7, so it is possible to send a sufficient flow rate of refrigerant to the evaporator 6. Due to this, even if the outside air temperature (TAM) is less than 0° C., the heating capacity of the evaporator 6 can be improved, so in the refrigeration cycle apparatus 20 of the 13th embodiment, it is possible to sufficiently bring out the auxiliary heating performance for augmenting the heating capacity of the heater core 5.

Further, the air-conditioning unit 1 of the 13th embodiment can raise the heat radiation temperature of the evaporator 6 immediately after startup of the engine E at the time of startup of the auxiliary heating operation mode, so the surface temperature of the heater core 5 placed in the air-conditioning duct 2 near the evaporator 6 rises and the temperature of the cooling water circulating through the heater core 5 rises faster. Further, since the compressor 7 is belt driven by the engine E through an electromagnetic clutch 8 at the time of the auxiliary heater mode, the compressor 7 increases the drive load of the engine E. Due to this, the amount of exhaust heat of the engine becomes larger, so the temperature of the cooling water circulating in the cooling water circulation circuit 14 rises faster.

Due to this, since the temperature of the cooling water rises above the predetermined temperature (for example, 40° C.) Ta, even when controlling the apparatus to delay the start of the blower fan, the centrifugal blower fan 13 immediately starts turning and the passenger compartment can be quickly heated.

Figure 29:
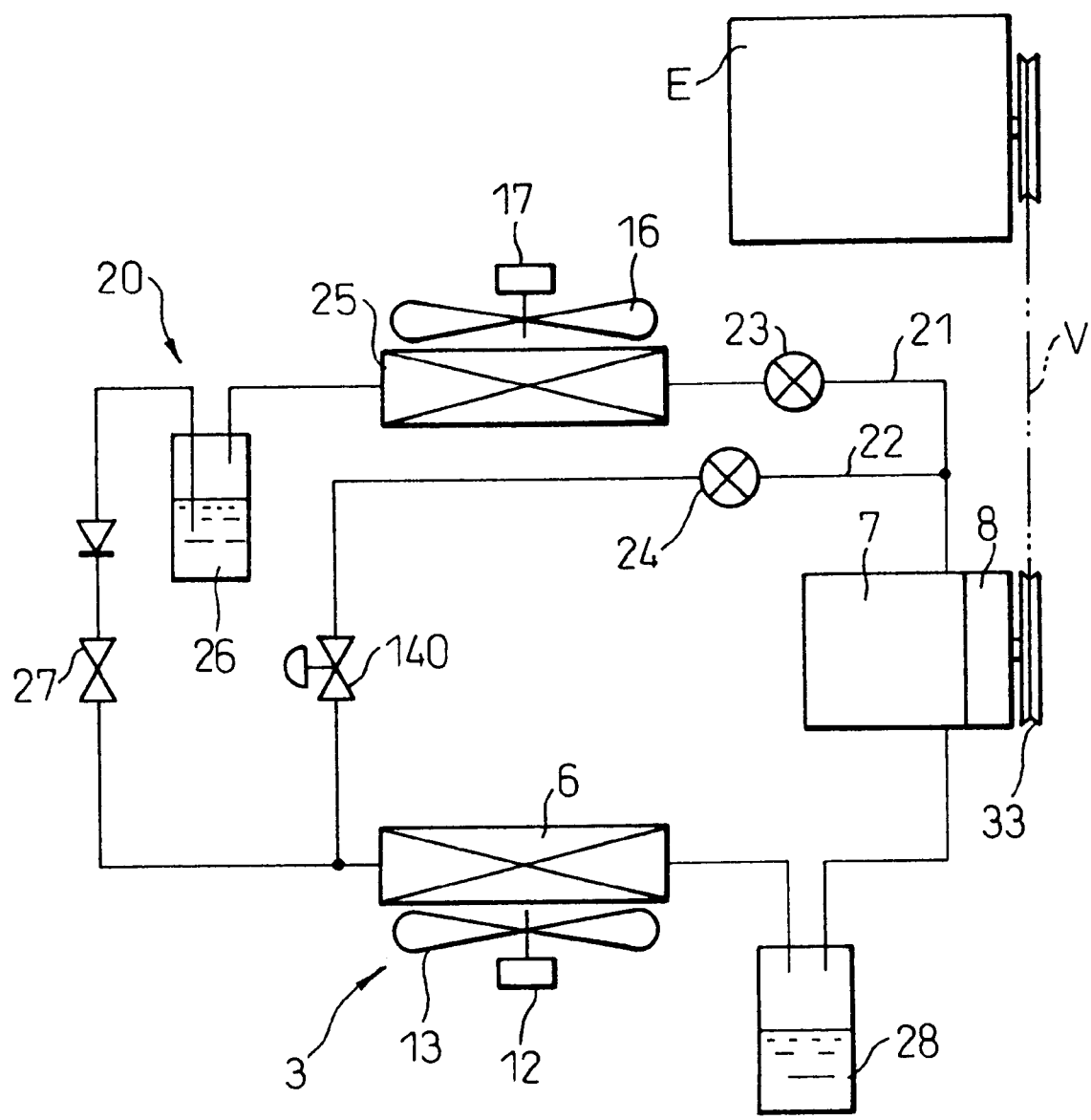
FIG. 29 is a view of the configuration of a refrigeration cycle apparatus of a vehicular air-conditioning system according to a 14th embodiment of the present invention.
Figure 30:
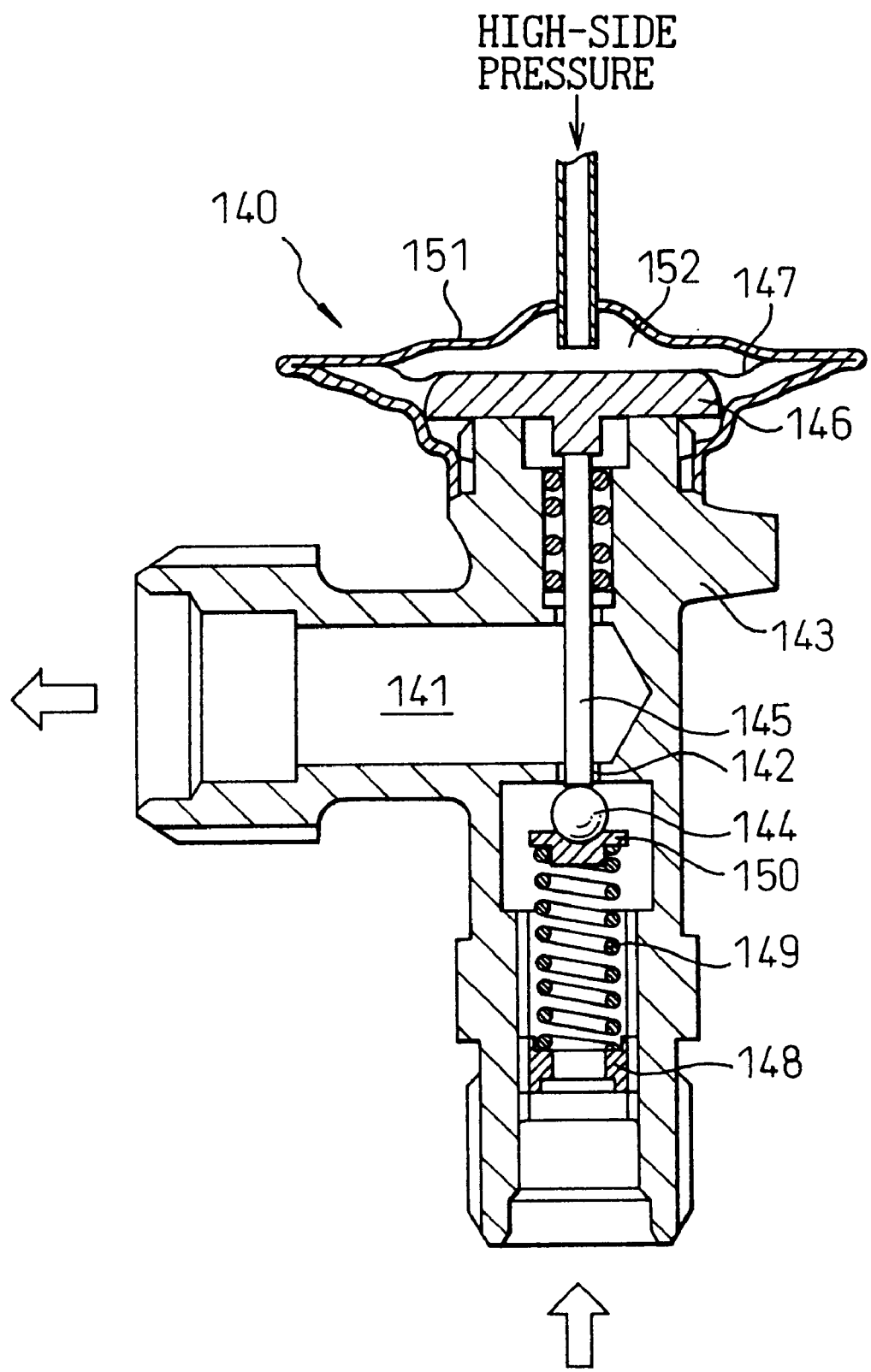
FIG. 30 is a sectional view of a variable throttling valve according to the 14th embodiment of the present invention.
Figure 31:
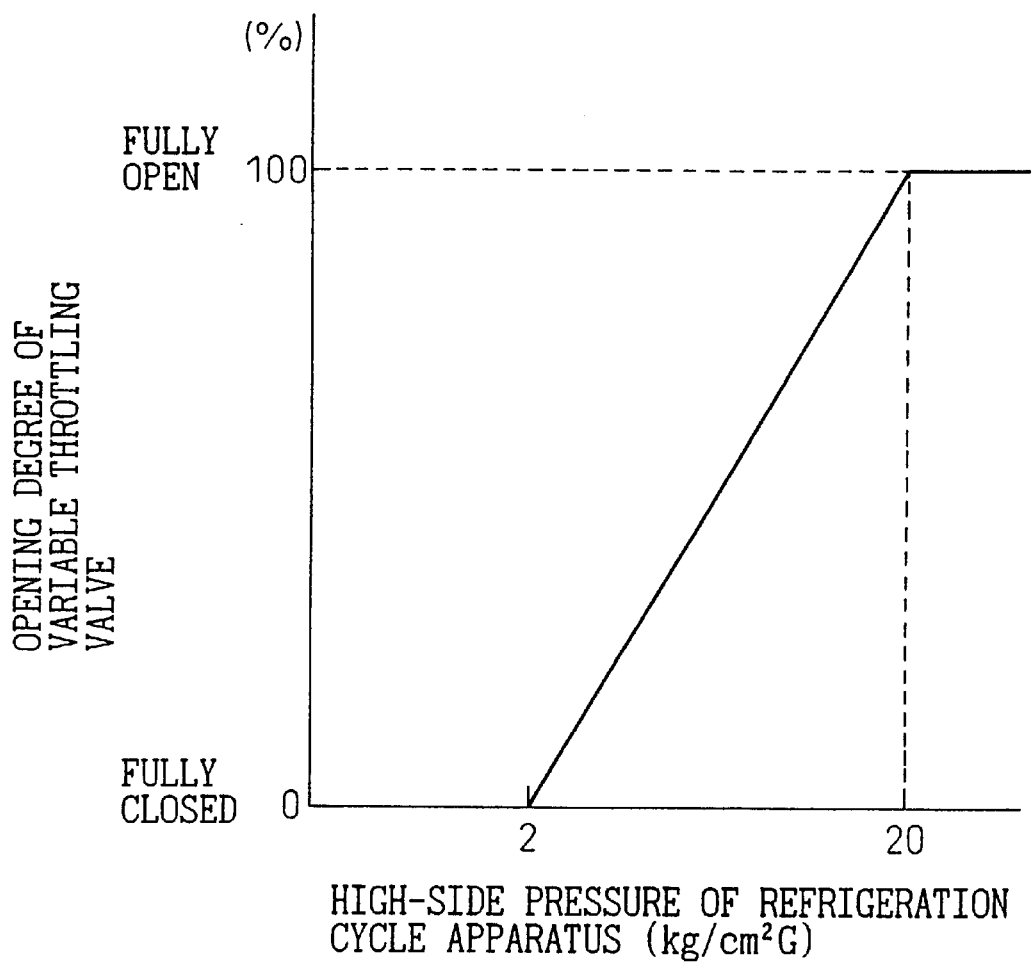
FIG. 31 is a graph of the opening degree of the variable throttling valve with respect to the high-side pressure of the refrigeration cycle apparatus according to the 14th embodiment of the present invention.

FIG. 29 to FIG. 31 show a 14th embodiment of the present invention. FIG. 29 shows a refrigeration cycle apparatus of a vehicular air-conditioning system, FIG. 30 shows a variable throttling valve provided in the refrigeration cycle apparatus, and FIG. 31 is a graph of the opening degree of the variable throttling valve with respect to the high-side pressure of the refrigeration cycle apparatus.

In the refrigeration cycle apparatus 20 of the 14th embodiment, the fixed calibrated orifice 29 of the 13th embodiment is changed to the variable throttling valve 140. This variable throttling valve 140 corresponds to the refrigerant passage throttling means of the present invention and is comprised of a valve housing 143 formed with an orifice 142 in the middle of the communication passage 141 communicating with the refrigerant passage leading the refrigerant from the second solenoid valve 24 to the evaporator 6, a ball-shaped valve element 144 arranged to be able to displace back and forth in the valve housing 143, a diaphragm 147 driving the valve element 144 through an operating rod 145 and stopper 146, and an adjustment spring 149 which enables adjustment of the opening pressure of the valve element 144 by an adjustment screw 148.

Among these, the valve element 144 adjusts the opening degree of the orifice 142 and is provided with a spring seat 150 with which the adjustment spring 149 abuts at the bottom of the illustration. The diaphragm 147 corresponds to the valve element driving means of the present invention and is housed in the housing 151. Further, the high-side pressure of the refrigeration cycle apparatus 20 acts in the pressure chamber 152 formed by the diaphragm 147 and the housing 151.

The variable throttling valve 140 of the 14th embodiment, due to the above configuration, receives the high-side pressure of the refrigeration cycle apparatus 20 in the pressure chamber 101, closes when the high-side pressure is less than 2 kg/cm$^2$G as shown in the graph of FIG. 31, and opens widely along with a rise in the high-side pressure, whereby it is possible to increase the discharge volume of the compressor 7 even if the outside air temperature (TAM) is less than −20° C. at the time of startup of the auxiliary heater mode.

Figure 32:
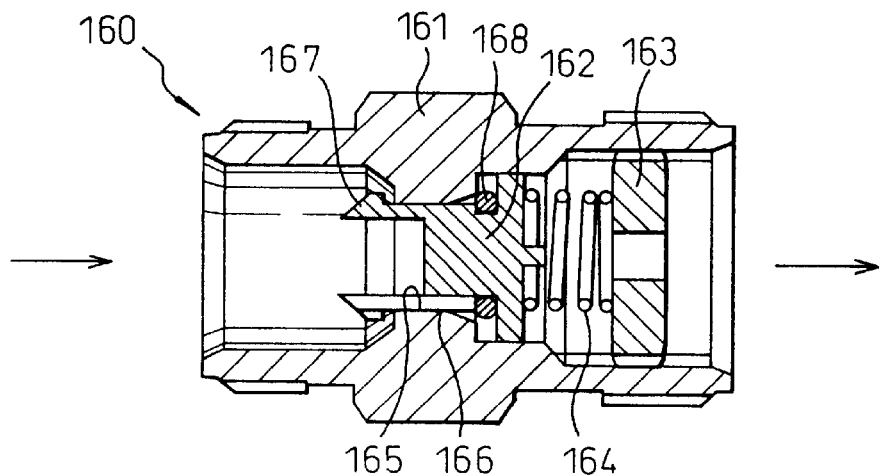
FIG. 32 is a sectional view of a differential pressure valve according to a 15th embodiment of the present invention.

FIG. 32 shows a 15th embodiment of the present invention and illustrates a differential pressure valve built in the refrigeration cycle apparatus.

In the 15th embodiment, a differential pressure valve 160 is provided in the middle of the refrigerant passage from the discharge port of the compressor 7 to the inlet of the fixed throttle portion 29 in the hot gas heater circuit 22 of the 13th embodiment. This differential pressure valve 160 is comprised of a valve body 161, a valve element 162 arranged to be able to displace back and forth in the valve body 161, and an adjustment spring 164 which enables adjustment of the opening pressure of the valve element 162 by an adjustment screw 163. Further, the valve element 162 is formed with a hook like stopper 167. An O-ring 168 is fit over the outer circumference of the valve element 162.

The differential pressure valve 160 of the 15th embodiment, being arranged in the middle of the refrigerant passage from the discharge port of the compressor 7 to the inlet of the fixed calibrated orifice 29, fully closes the orifice 165 at the time of startup of the auxiliary heater mode to increase the discharge volume of the compressor 7. When the pressure difference before and after the valve element 162 becomes large, that is, when the high-side pressure rises higher than the opening pressure of the valve element 162 (for example, 2 kg/cm$^2$G), the valve element 162 opens and a hot gas heater circuit 20 is formed in the refrigeration cycle apparatus 20.

In the present embodiments, the outside variable volume compressor was constituted by the refrigerant compressor 7, electromagnetic clutch 8, electromagnetic volume control valve 9, etc., but the outside variable volume control compressor may also be configured by the refrigerant compressor 7, the electromagnetic type volume control valve 9, etc. without provision of the electromagnetic clutch 8 or other clutch means. In this case, the refrigerant compressor 7 is made to be directly driven by the internal combustion engine.

In the present embodiments, further, at the time of startup of the auxiliary heater mode, the hot gas heater circuit 22 was fully closed after startup of the refrigerant compressor 7 until predetermined conditions were satisfied and the various valve devices were opened to form the hot gas heater circuit 22 after these predetermined conditions were satisfied, but it is also possible to throttle down (not fully close) the sectional area of the refrigerant passage constituting the hot gas heater circuit 22 compared with that of normal operation after startup of the compressor 7 until predetermined conditions were satisfied when starting up the auxiliary heater mode.

In the present embodiments, further, the example was shown of use of an outside variable volume type compressor provided with an electromagnetic type volume control valve 9 which increases the discharge volume of the refrigerant discharged from the discharge port of the compressor 7 when the suction pressure of the refrigerant sucked into the suction port of the compressor 7 becomes high, but use may also be made of a variable volume type compressor provided with a variable discharge volume means which reduces the discharge volume of the refrigerant discharged from the discharge port of the refrigerant compressor when the suction pressure of the refrigerant sucked into the suction port of the refrigerant compressor becomes high. Further, use may be made of a variable volume type compressor provided with a variable discharge volume means which reduces the discharge volume of the refrigerant discharged from the discharge port of the refrigerant compressor when the discharge pressure of the refrigerant discharged from the discharge port of the refrigerant compressor becomes high.

In the above embodiments, the present invention was applied to the refrigeration cycle apparatus for a vehicular air-conditioning system for an automobile etc., but the present invention may also be applied to the refrigeration cycle apparatus of an air-conditioning system of an aircraft, ship, railroad car, etc. Further, the present invention may also be applied to the refrigeration cycle apparatus of an air-conditioning system of a factory, store, house, etc.

While the invention has been described by reference to specific embodiments chosen for purposes of illustration, it should be apparent that numerous modifications could be made thereto by those skilled in the art without departing from the basic concept and scope of the invention.

What is claimed is:

1. A refrigeration cycle apparatus comprising:
   a refrigerant compressor driven in rotation by an internal combustion engine so as to compress the refrigerant,
   a refrigerant evaporator for performing heat exchange with air on the inflowing refrigerant to cause it to evaporate and vaporize,
   a refrigerant circulation circuit for circulating the refrigerant discharged by said refrigerant evaporator and returning it to said refrigerant compressor, and
   variable discharge volume means for reducing the discharge volume from the refrigeration cycle apparatus when a discharge pressure from said refrigeration cycle apparatus becomes higher than a first predetermined value,
   wherein said variable discharge volume means increases the discharge volume from said refrigeration cycle apparatus when the discharge pressure from said refrigeration cycle apparatus becomes lower than a second predetermined value.

2. A vehicular air-conditioning system comprising:
   (a) an air-conditioning duct for leading air-conditioned air into a vehicle passenger compartment,
   (b) a refrigerant evaporator arranged in the air-conditioning duct for performing heat exchange with air on the inflowing refrigerant to cause it to evaporate and vaporize,
   (c) a heater core arranged in said air-conditioning duct at a downstream side of air of said refrigerant evaporator for heating air using cooling water of an internal combustion engine as a source of heat for heating,
   (d) a refrigerant compressor driven in rotation by an internal combustion engine so as to compress the refrigerant,
   (e) a refrigerant circulation circuit for circulating the refrigerant discharged by said refrigerant compressor to said refrigerant evaporator and returning it to said refrigerant compressor,
   (f) a cooling water circulation circuit for circulating the cooling water flowing out from said internal combustion engine to said heater core and returning it to said internal combustion engine,
   (g) a variable discharge volume means for reducing the discharge from said refrigeration cycle apparatus when the discharge pressure from said refrigeration cycle apparatus becomes higher than a setting,
   (h) a venting temperature detecting means for detecting a venting temperature of air vented from said air-conditioning duct into the vehicle passenger compartment, and
   (i) a variable discharge pressure means for setting said discharge pressure lower the closer the venting temperature detected by said venting temperature detecting means is to a target value.

3. A vehicular air-conditioning system as set forth in claim 2, wherein said venting temperature detecting means is a heater venting temperature detecting means for detecting a temperature of air right after passing through said heater core.

4. A vehicular air-conditioning system as set forth in claim 2, wherein said venting temperature detecting means is a cooling water temperature detecting means for detecting a temperature of cooling water flowing into said heater core.

* * * * *